United States Patent [19]
Tan et al.

[11] Patent Number: 5,252,964
[45] Date of Patent: Oct. 12, 1993

[54] NON-CONTACT PAGER PROGRAMMING SYSTEM AND A PAGER FOR USE THEREWITH

[75] Inventors: William W. L. Tan; Pha C. Nguyen; Pamela A. Rakolta, all of Lake Worth; Silvia M. Viteri, Lantana; Gary Lee Pace; Boca Raton, all of Fla.

[73] Assignee: Motorola, Inc., Schaumburg, Ill.

[21] Appl. No.: 928,164

[22] Filed: Aug. 13, 1992

Related U.S. Application Data

[63] Continuation of Ser. No. 410,562, Sep. 20, 1989, abandoned.

[51] Int. Cl.$^5$ .............................................. G08B 5/22
[52] U.S. Cl. ............................ 340/825.48; 340/825.44
[58] Field of Search ................. 341/175; 273/138 A, 273/1 E, DIG. 28; 455/186, 151; 379/56, 57, 102, 104, 105, 355, 356, 444; 340/825.44–825.48, 825.54, 311.1; 367/197–199; 49/29

[56] References Cited

U.S. PATENT DOCUMENTS

| | | | |
|---|---|---|---|
| 3,337,992 | 8/1967 | Tolson | 49/29 |
| 3,976,995 | 8/1976 | Sebestyen | 341/175 X |
| 4,233,685 | 11/1980 | Taylor | 455/151 |
| 4,422,071 | 12/1983 | de Graaf | 340/825.5 X |
| 4,518,961 | 5/1985 | Davis et al. | 340/825.44 |
| 4,592,546 | 6/1986 | Fascenda et al. | 273/138 A X |
| 4,593,155 | 6/1986 | Hawkins | 340/825.5 X |
| 4,868,561 | 9/1989 | Davis | 340/825.48 X |
| 4,882,579 | 11/1989 | Siwiak | 340/825.47 X |

*Primary Examiner*—Ulysses Weldon
*Attorney, Agent, or Firm*—Floyd E. Anderson; William E. Koch; Thomas G. Berry

[57] ABSTRACT

A non-contact pager programming system includes a controller (30) which is responsive to command and data signals to generate first signals (34) including command and data words to govern a transmitting circuit (36) to transmit over the air a programming signal (46) digitally modulated in accordance with a reception protocol. The programming system may also include a receiving circuit (42) which is governed by at least one second signal (40) generated by the controller to receive over-the-air signals (52) generated by the pager being programmed in response to the programming signal.

46 Claims, 19 Drawing Sheets

```
MOTOROLA Radio Service Software         Select Function Key F1 - F10

XYZ         Ver:
Main Program

F1   -     HELP
F2   -     KEY HELP
F3   -     READ a pager (Pager must be ON and inserted in interface box).
F4   -
F5   -     PROGRAM a single pager
F6   -     PROGRAM sequential pagers
F7   -
F8   -     RETRIEVE a stored pager configuration from disk
F9   -     SETUP computer configuration
F10  -     EXIT radio-service software, return to DOS F1      F2      F3      F4      F5         F6         F7      F8        F9      F10
HELP    KEY    READ         PROGRAM    PROGRAM          RETRIEVE    SETUP    EXIT
        HELP   A PAGER      SINGLE     SEQUENTIAL       FROM DISK            TO DOS
```

*FIG.5*

```
MOTOROLA Radio Service Software         Enter Characters

XYZ         Ver:
 Page 1 of 3
Main Program

Inventory Control #

Coding Format      POCSAG
                   Code A              Code B
                   None                None 1234                1234
Active      Y,N
Functions   T,A,N
Priority    Y,N
Code type   Individual                 Individual
Code Alerts None                       None
```

```
MOTOROLA Radio Service Software          Use the Spacebar to Select

XYZ         Ver:
 Page 2 of 3
 Main Program
```

| | | | |
|---|---|---|---|
| Vibrator | Yes | Reminder Chirp While On | Yes |
| Data Inovation | No | Completely Silent in MEM | No |
| Sequential Lockout | 0 | Chirp in MEM | Yes |
| Duplicate-Message-Detection Buffer Size | None | Alpha Beep on Bad Data | Yes |
| Out of Range | Yes | Numeric Beep on Bad Data | No |
| Show Source | Yes | International Char Set | USA |
| Memory-Full Indication | Yes | International Symbols | No |
| Alert Level | Full | Alternate Screen Prompts | No |
| Alert Length | 12 Sec | RF Programming Allowed | No |
| | | Download Password Req'd | No |
| | | Pager Password | |

```
F1    F2    F3    F4    F5    F6          F7    F8    F9    F10
HELP  KEY                    CLEAR TO                        EXIT
      HELP                    EMPTY                         TO MAIN
```

FIG. 8

```
MOTOROLA Radio Service Software          Enter Characters

XYZ         Ver:
 Page 3 of 3
 Main Program
```

| Original Prompts | Alternate Prompts |
|---|---|
| NO MESSAGES | NO MESSAGES |
| DELETE? | DELETE? |
| DUPLICATE | DUPLICATE |
| LOCK FULL | LOCK FULL |
| LOW BATTERY | LOW BATTERY |
| LOCK? | LOCK? |
| UNLOCK? | UNLOCK? |
| MEMORY FULL | MEMORY FULL |
| OUT OF RANGE | OUT OF RANGE |
| TONE ONLY | TONE ONLY |
| GROUP | GROUP |
| PRINT? | PRINT? |

```
F1    F2    F3    F4    F5    F6          F7    F8    F9    F10
HELP  KEY                    CLEAR TO                        EXIT
      HELP                    EMPTY                         TO MAIN
```

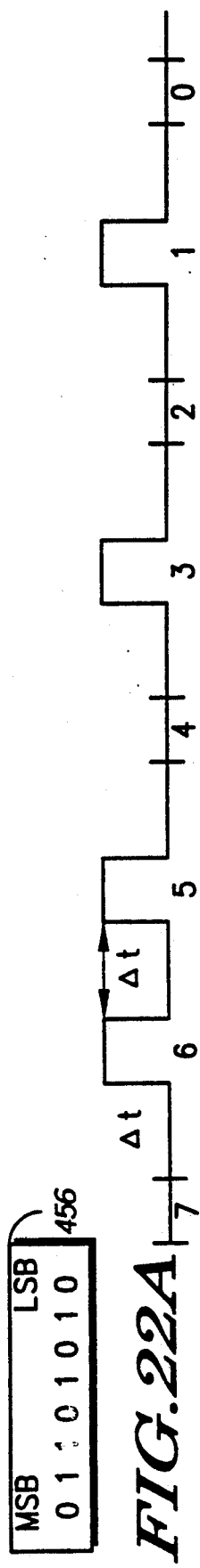

NON-CONTACT PAGER PROGRAMMING SYSTEM AND A PAGER FOR USE THEREWITH

This is a continuation of application Ser. No. 07/410,562, filed Sep. 20, 1989, now abandoned.

CROSS REFERENCE TO RELATED COPENDING APPLICATIONS

Ser. No. 382,069, filed Jul. 17, 1989, entitled "Radio Pager with IF Frequency", which is a continuation-in-part application of Ser. No. 299,494, filed Jan. 23, 1989, now abandoned.

BACKGROUND OF THE INVENTION

The present invention relates to pager programming systems, in general, and more particularly to a non-contact pager programming system governed by command and data words generated by a user interactive central controller to program and read the pager's non-volatile memory which includes registers for storing a plurality of data words to characterize the operation of the pager.

Contemporary pagers are generally controlled by a digital controller, like a microcomputer, for example, and include a non-volatile memory, commonly referred to as a code plug, for storing data words in registers thereof to characterize the operation of the pager. Accordingly, the various options, features and functions of a pager may be programmed via the code plug using a pager programmer.

Current pager products come in sizes and shapes varying from a wrist watch to a parallelepiped container resembling a small tape recorder, for example. In addition, each pager product may include a different electrical connector for physical contact to a programmer. Consequently, a unique code plug programmer may be needed for some pager products because of their different size and shape and unique physical connector.

In addition, because of the demands to miniaturize the pager products, the code plug programming connections present a problem because they occupy much needed pager product volume. Another demand on pager manufacturers is to produce a water resistant pager which presents a further problem with regard to the need for disassembling the product to make physical contact when programming the code plug thereof.

Thus, it appears completely desirable to provide a universal programmer which may program a variety of pager products of different shapes and sizes to avoid the need to design and build a unique programmer for each. It would be further desirable to make the universal programmer perform the programming operation of the code plug of the pager product without having to make physical contact therewith. It would be even further desirable to achieve the non-contact programming operations without having to redesign the hardware of the pager(s) to be programmed. The present invention achieves these and other objects which will become more evident from the following description of a preferred embodiment of the invention taken together with the accompanying figures of the drawing therefor.

SUMMARY OF THE INVENTION

In accordance with the present invention, a non-contact pager programming system is governed by command and data signals generated by user interactive means to program a non-volatile memory of a pager. The programmable non-volatile memory has registers for storing a plurality of data words which characterize the operation of the pager. The system comprises controller means which is responsive to the command and data signals received from the user interactive means to generate first signals including command and data words; and transmitting means governed by the first signals to select a carrier frequency corresponding to the pager being programmed and to transmit over the air a programming signal at the selected carrier frequency digitally modulated in accordance with the pager's reception protocol and the command and data words generated by the controller means.

In accordance with one embodiment, the programming system includes a desk top shielded enclosure for containing at least the transmitting means and a chamber for accommodating a pager to be programmed. Further, the transmitting means may be governed by the first signals to select a carrier frequency in the intermediate frequency (IF) range of the pager being programmed. Still further, the system may include means governed by a third signal generated by the controller means to enable and disable the transmitting means. Still further, the transmitting means may include an impedance matching circuit coupled to at least one antenna and a power amplifier thereof and may be governed by an impedance selection signal generated by the controller means to form an impedance corresponding to the selected carrier frequency.

In another embodiment, the programming system may include a receiving means governed by at least one second signal generated by the controller means to receive over-the-air signals generated by the pager being programmed in response to the programming signal of the transmitting means, the pager generated signals being representative of data words of selected storage registers of the non-volatile memory thereof, to convert the received signals to digital signals representing the data words and to conduct the digital signals to the controller means. The receiving means may also be contained in the desk top shielded enclosure. In addition, the controller means may generate a third signal to enable and disable the receiving means.

In yet another embodiment, audio signals are generated by the pager being programmed in response to the programming signal, in which case, the receiving means includes: means for receiving the audio signals from the air and converting them to electrical signal representations; means governed by a control signal generated by the controller means to recover the data words from the electrical signal representations; and means for conducting the recovered data words to a controller means. Still further, the controller means may be responsive to an initial data word received from the receiving means for receiving subsequently recovered data words therefrom. Still further, the receiving and converting means may include a plurality of microphones switchably selected for use by the recovering means.

In yet another embodiment, the user interactive means may include a user interactive central controller, and the control means includes means for communicating with the central controller to receive and transmit command and data words therebetween.

In accordance with another aspect of the present invention, a pager is operative in response to an externally transmitted page message including command and data words to program and read a programmable non-volatile memory thereof in accordance with the command and data words. The pager comprises means for receiving the page and recovering the command and data words from the message thereof; means governed by a recovered read command to read the data word of at least one register of the non-volatile memory corresponding to the read command and to generate an audio signal representative of the read data word; and means governed by a recovered program command word and at least one new data word to write the at least one new data word into at least one register of the non-volatile memory corresponding to the program command.

BRIEF DESCRIPTION OF THE DRAWINGS

FIGS. 5-8 exemplify menu screens for display on a CRT of a central controller for user interaction with the programmer depicted in FIG. 3.

FIG. 22 includes time waveforms A-G exemplifying a method used by the programming system for acoustically communicating between a pager and a programmer.

DESCRIPTION OF THE PREFERRED EMBODIMENT

Figure 1:
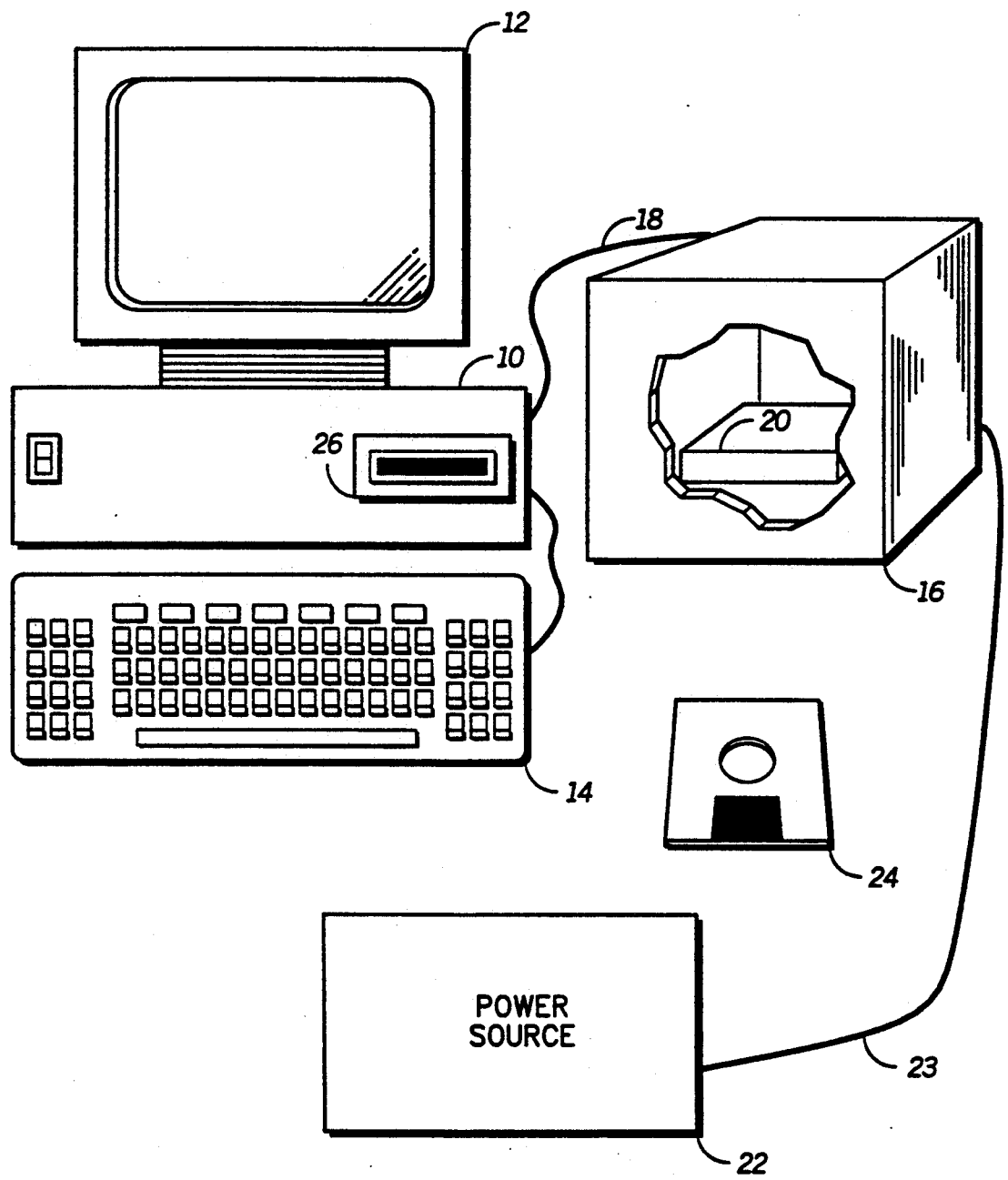
FIG. 1 is a block diagram illustration of a typical environment for application of the present invention.

FIG. 1 is a block diagram illustration of a typical environment for application of the present invention. Referring to FIG. 1, a user interactive central controller 10 which may be a personal computer of the type manufactured by IBM Corporation taken from either the PC or PS/2 family, for example. A conventional cathode ray tube (CRT) 12 and conventional keyboard unit 14 may be coupled to the controller 10 for interacting with a user or programmer. The controller 10 may be coupled to a pager programmer 16 utilizing a conventional asynchronous communications adapter unit contained therein and standard RS232 connections 18, for example.

For the present embodiment, the programmer 16 is self-contained in a "desk top" type enclosure. The enclosure, which is shown in greater detail by the cross-sectional view of FIG. 2, may be a sheet-metal box of an appropriate shielding material and have a hinged lid for access to a chamber for accommodating a pager 20 to be programmed. Power may be provided to the programmer 16 over line 23 from a power source 22 which may be derived from a conventional 120 volt AC wall outlet or the like.

In the present embodiment, a core program for universal programming operations and a plurality of pager code plug memory maps are stored on a diskette 24 for use in the controller 10 through a conventional disk drive unit 26 thereof.

Figure 3:
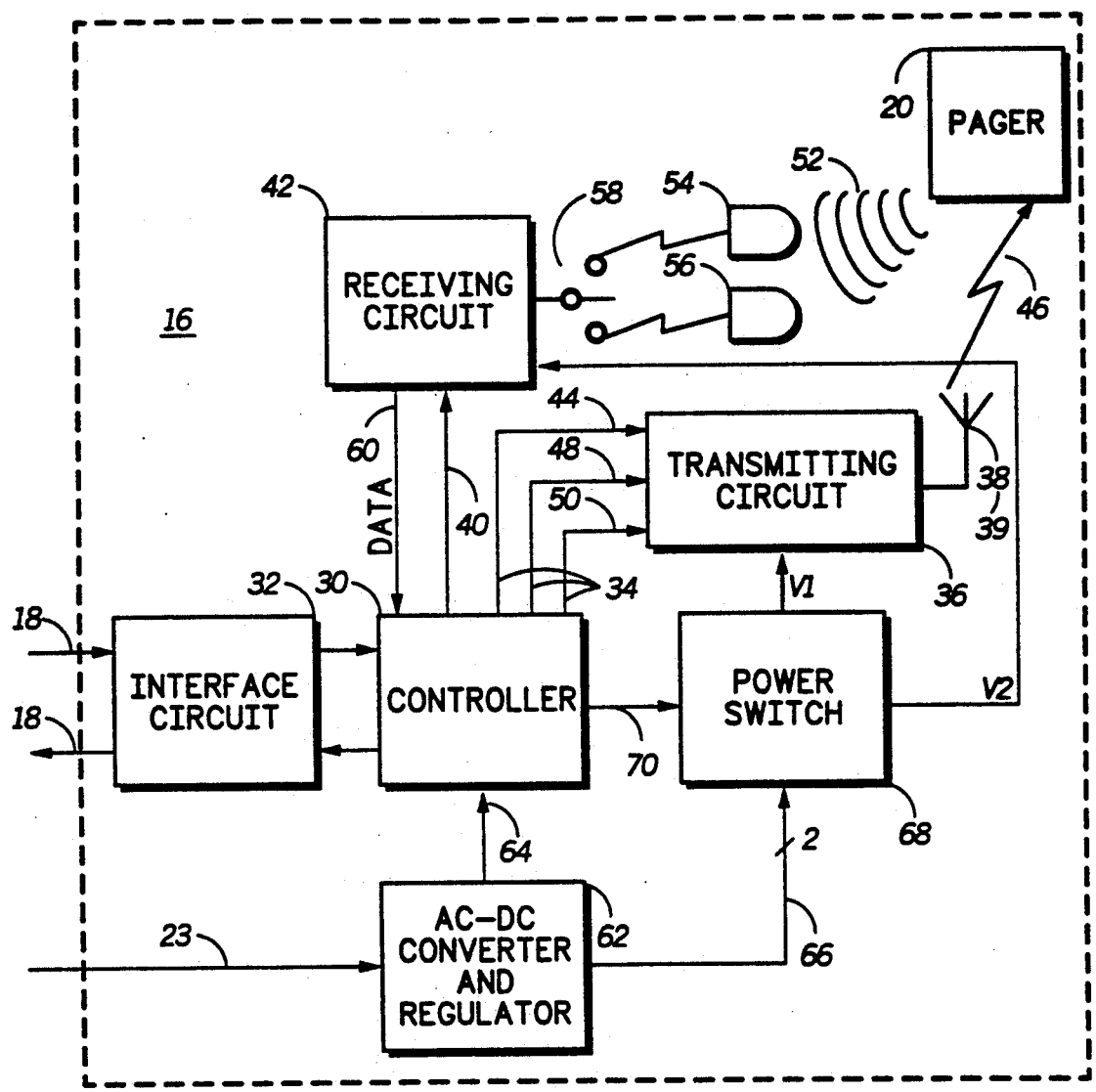
FIG. 3 is a functional block diagram schematic of a pager programming system suitable for embodying the principles of the present invention.

A suitable embodiment of the pager programmer 16 is shown in the block diagram schematic of FIG. 3. Referring to FIG. 3, the programmer 16 may include an interface controller 30 which, for the present embodiment, may be a microcomputer unit of the type manufactured by Motorola, Inc., model number MC68HC805C8 which includes a plurality of input/output (I/O) ports and a serial communication interface (SCI) for providing a physical interface with the personal computer 10 and other units of the programmer 16 as will be described in greater detail hereinbelow. For more details of the structure and operation of the aforementioned microcomputer unit, reference is made to the Motorola published (1985) Technical Data Bulletin ADI991R2 which is incorporated by reference herein.

More specifically, the controller 30 is operative to communicate with the central controller 10 through the SCI lines thereof to receive and transmit over signal lines 18 command and data words therebetween. An interface circuit 32 may be disposed in the signal lines 18 between the controllers 10 and 30 to perform such functions as voltage level shifting and the like as the case may be. The controller 30 is responsive to the command and data words received from the central controller 10 to generate a plurality of first signals 34 which are conducted to a transmitting circuit 36 for governing the transmission of the command and data words to the pager 20 being programmed via at least one antenna 38. In addition, the controller 30 governs such transmission in a format based on the reception protocol of the particular pager being programmed. Still further, the controller 30 is operative to generate at least one second signal 40 for governing a receiving circuit 42 to receive data words from the pager 20 for reading selected storage registers of the non-volatile memory (code plug) thereof.

In the present embodiment, the controller 30 provides a signal 44 to the transmitting circuit 36 to select a carrier frequency, preferably in the intermediate frequency (IF) range, corresponding to the pager being programmed for use in transmitting over-the-air a programming signal 46 at said selected carrier frequency digitally modulated in accordance with the pager's reception protocol and the command and data words which are provided to the transmitting circuit 36 by the controller 30 over another signal line 48. The controller 30 may also provide a signal 50 to the transmitting circuit 36 to select an appropriate antenna impedance to match the selected transmission carrier frequency.

Further in the present embodiment, the pager 20 is operative in response to the commands of the over-the-air programming signal 46 to transmit over-the-air signals 52 representative of selected digital words accessed from the code plug thereof. According to one embodiment of the present invention, the transmitted signals 52 may be acoustic. Consequently, the receiving circuit 42 may include at least one microphone for receiving the audio signals 52 and converting them to their electrical signal representations. The present embodiment utilizes a plurality of microphones represented by 54 and 56 which may be switchedly selected for use by the receiving circuit 42 utilizing a single-pole multi-throw switch 58 which may be controlled by the controller 30 or autonomously by the receiving circuit 42 as the case may be. The receiving circuit 42 is operative to recover the data words from the electrical signal representations and conduct them over a signal line 60, for example, to the controller 30 which may use the data words for verification when in a programming mode or to transmit back to the central controller 10 when in a read mode.

Further, in the present embodiment, power supplied to the programmer 16 over power line 23 may be converted and regulated into a plurality of voltage levels using a conventional circuit 62 for such purposes and the various regulated voltages may be supplied to the controller 30 over signal line 64 and to the transmitting circuit 36 and receiving circuit 42 over signal lines 66. A power switch 68 may be provided and governed by the controller 30 via signal line 70 to switch the supply power between the transmitting circuit 36 and receiving circuit 42 as one method of disabling such circuits, at times, to reduce the amount of interfering electrical noise which may be coupled from one circuit to the other in such a close confinement as that of the "desk top" enclosure.

In the instant embodiment, the central controller and interface controller are described as separate devices 10 and 30, respectively; however, it is well understood by all of those skilled in the pertinent art that both such controllers could be embodied in a single device, such as the personal computer 10 external to the programmer enclosure 16 or the interface controller 30 internal to the enclosure 16, for example. For the case in which both controllers are embodied in an external controller, the signal lines governing the operation of the various programmer circuits may be supplied to the enclosure 16 through suitable I/O ports of the external controller, for example. On the other hand, for the case in which both controllers are embodied in an internal controller to the enclosure 16, then a suitable user interactive interface shall be included for the enclosure 16 to permit data entry and access by the user or programmer. Moreover, it is further understood that the split of the functional operations between the central and interface controllers may also be different than that described without deviating from the intended scope of Applicants' invention.

Figure 2:
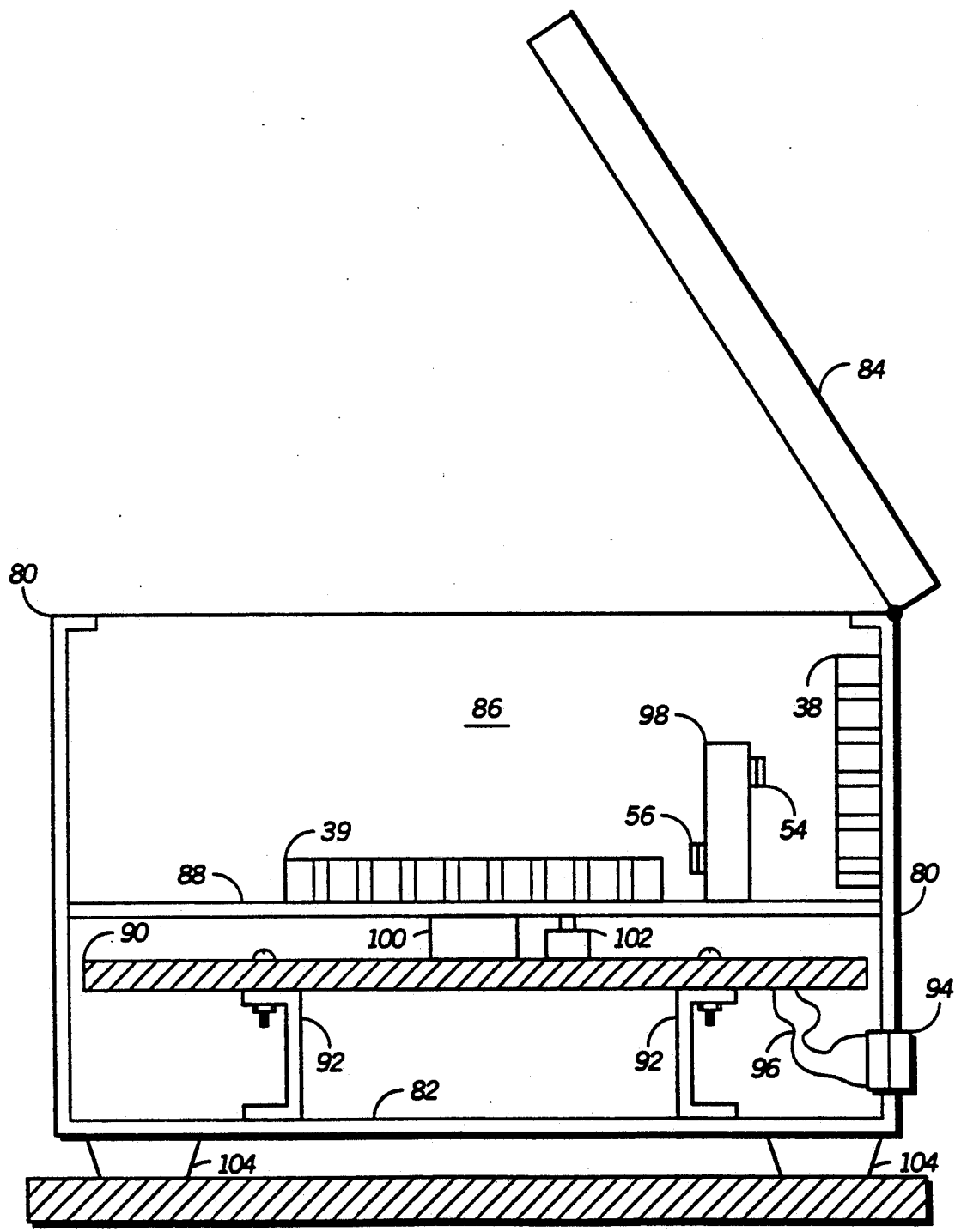
FIG. 2 is a cross-sectional illustration of a desk top shielded enclosure suitable for use in the embodiment of FIG. 1.

A suitable physical embodiment of the programmer enclosure 16 is shown in the cross-sectional illustration of FIG. 2. Referring to FIG. 2, the enclosure 16 may be a rectangular box comprising sides 80 and bottom 82 and including a hinged top 84 which opens to accommodate a pager of a variety of sizes and shapes. A chamber 86 is formed within the programmer enclosure by a false bottom plate 88 which is fixed to the sides 80. Accordingly, when the hinged top 84 of the enclosure is opened, a pager 20 may be disposed in the chamber 86 thereof for programming operations and the hinged top 84 thereafter closed to seal off the unit from any outside electrical and acoustic interference contained in the surrounding environment. The electronics of the programmer described in connection with the embodiment of FIG. 3 may be disposed on a printed circuit board 90 disposed beneath the plate 88 and supported by support members 92 from the bottom 82 of the enclosure. For communicating with the central controller 10, a conventional RS232 connector 94 may be disposed in one of the sides 80 of the enclosure and electrically connected to the printed circuit board 90 utilizing a flat ribbon cable 96, for example.

The present embodiment employs a plurality of antennas, represented in FIG. 2 by 38 and 39, which may be disposed at various locations in the chamber 86 to provide for omnidirectional radiation to a pager unit. The antennas 38 and 39 may be of the ferrite-core coil variety and include standard plug connections for coupling to the transmitting unit disposed on the printed circuit board 90. The plurality of microphones, represented in FIG. 2 by 54 and 56, may be disposed on a supporting member 98 above the surface of the plate 88 and arranged so as to detect audio signals which may be generated acoustically from a pager source disposed in the chamber 86 in various orientations.

Further disposed on the printed circuit card 90 may be a manual power switch 100 which may protrude through the plate 88 to permit manual operation thereof for supplying power over signal line 23 to the programmer electronics. A power indication light 102 may also be disposed on the printed circuit board 90 and protrude through the plate 88 as an indication of power being supplied to the programmer electronics. As a further precaution, the pager enclosure may rest on a desk top surface or the like utilizing isolating legs 104 which are affixed to the bottom 82 thereof.

Figure 4A:
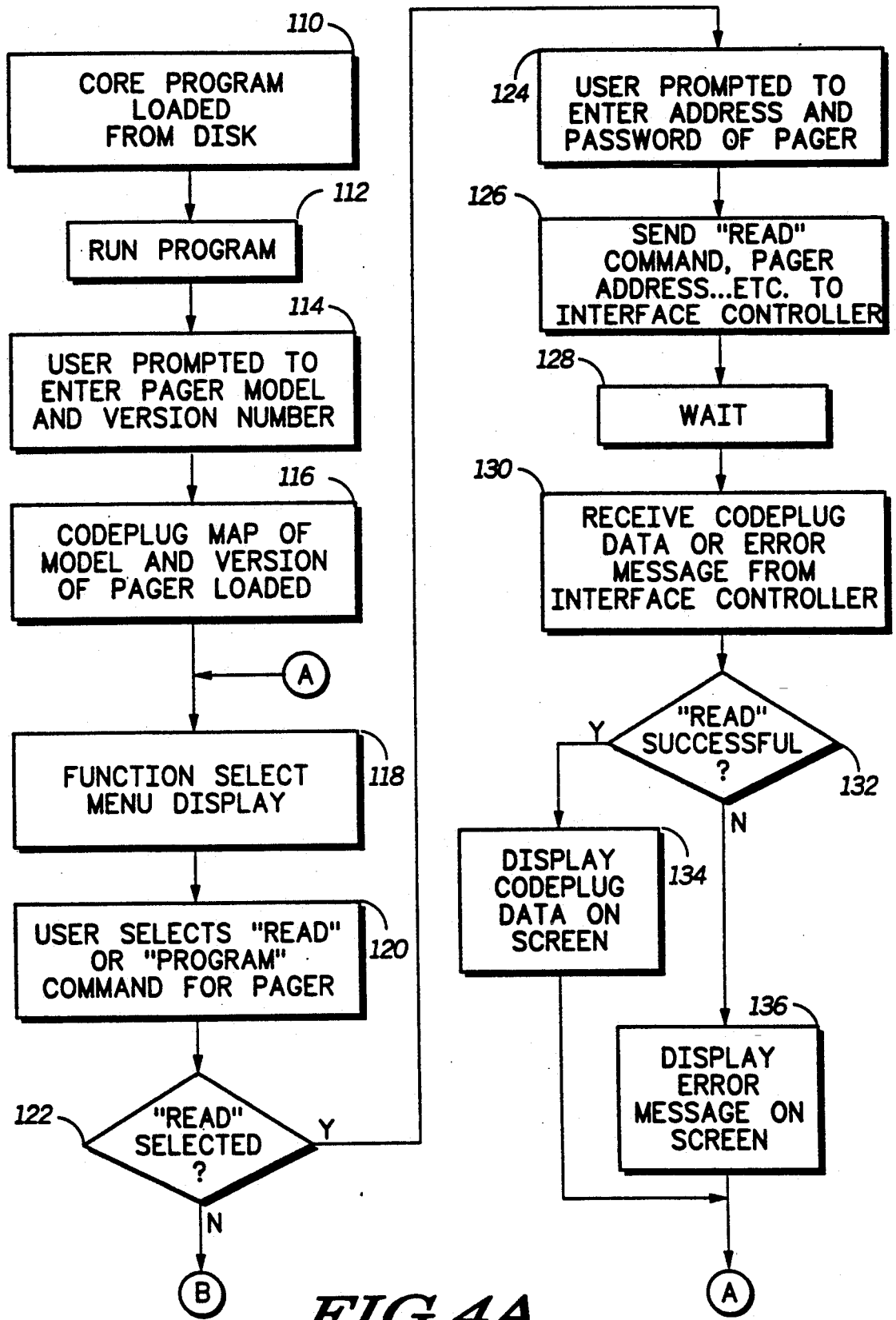
FIGS. 4A and 4B together form a flow chart exemplifying the programming of a central controller for user interaction with the programmer depicted in FIG. 3.
Figure 4B:
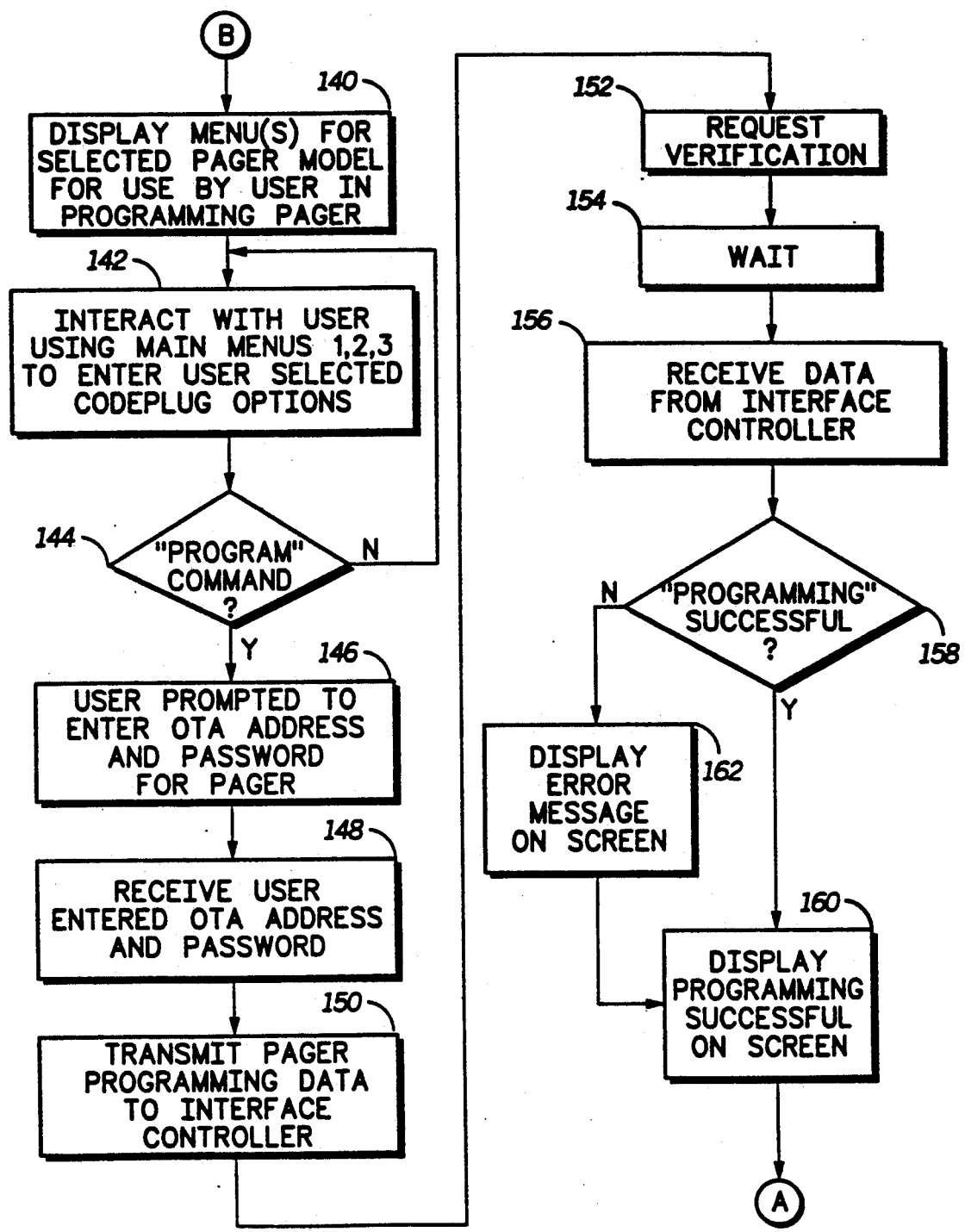

The programming of the central controller 10 for user interaction with the programmer 16 in accordance with one embodiment of the invention is exemplified in the flow charts of FIGS. 4A and 4B. Referring to FIG. 4A, with the diskette 24 loaded into the disk drive 26 of the controller 10, the instructions of the block 110 permit the user to load the core program stored on the diskette 24 into the controller 10 for execution thereby when the appropriate software commands are entered by the user via keyboard 14. In block 112, the core program is instructed to be run. In block 114, the user is prompted through the CRT 12 to enter the pager model and version number, if appropriate, of the pager 20 to be programmed by the programmer 16. After receiving this information, in block 116, the controller 10 may load into the controller 10 the code plug map of the pager model being programmed from the diskette 24.

Thereafter, in block 118, the controller 10, through execution of the core program, may display a function select menu screen on the CRT 12 to prompt the user as to the next step in the programming operation. A suitable function select menu screen for this purpose is exemplified in FIG. 5. In response, the user may select and enter a read or program command by depressing the corresponding function key on the keyboard 14 and the selection is processed by the instructions of the block 120. In decisional block 122, the controller 10 determines which command was selected by the user.

If the read command was selected, the program flow branches to block 124 wherein the user is prompted to enter the unique address of the pager being programmed. In some instances, depending upon the sophistication of the system, a separate pager password may also be requested. Also depending on the sophistication of the system, the user may be requested to enter the information in the form of data words he or she would like to read from the code plug of the pager. Thereafter in block 126, the controller assembles the necessary information including the proper command, pager address and appropriate code plug addresses, if needed, and sends the block of information properly formatted to the interface controller 30 using conventional asynchronous communication techniques via the RS232 interface 18. The controller 10 may then wait for reception of signals from the controller 30 in accordance with the instructions of block 128. The instructions of block 130 permit the controller 10 to receive the requested code plug data or an error message from the interface controller 30. In the decisional block 132, it is determined whether or not the read command and operation was successful. If successful, the controller 10 displays the requested code plug data on the CRT screen 12 properly formatted in accordance with the instructions of block 134; otherwise, an error message is displayed on the CRT screen 12 in accordance with the instructions of block 136. Thereafter, the program flow may be continued at block 118 where the function select menu screen is once again displayed to the user for his or her selection of the next operation.

In the event that a user selects the program command as determined by the decisional block 122, program flow may continue at block 140 shown in the flow chart of FIG. 4B. The instructions of block 140 cause the central controller 10 to display various menus on the screen 12 for use by the user in programming the pager via programmer 16. Examples of such menu screens are shown in FIGS. 6, 7 and 8. Note that the menus are directed to the programming of a wide variety of functions, options and features all characterized by the digital bits of data words stored in the code plug of the pager being programmed. Note also that the menu shown in FIG. 6 permits the user to even identify the reception protocol of the particular pager being programmed so that the central controller 10 or the interface controller 30 may format the commands and data for transmission to the pager being programmed. The instructions of the block 142 permit the user to enter via keyboard 14, for example, his or her selected code plug options using the main menus of FIGS. 6, 7 and 8. Thereafter in the decisional block 144, the central controller waits for a "program" command from the user in order to continue. If no program command is forthcoming, the controller 10 continues to interact with the user in selecting the code plug options.

Once the "program" command is entered by the user, the program flow continues at block 146 wherein the user is prompted to enter the over-the-air address of the pager similar to that described in connection with block 124. A password may also be desired. Once the data is received by the controller 10 per instructions of block 148, it is properly formatted and transmitted to the interface controller 30 via the communication interface 18 using the instructions of block 150. In some programming systems, it may be necessary to request verification via the same communication link 18 using the instructions of block 152. Thereafter, the controller 10 is programmed according to block 154 to await signalling from the interface controller 30. In block 156, the controller is instructed to receive data from the controller 30 over the communication link 18. In the present embodiment, the central controller 10 via the decisional block 158 makes the determination of whether or not the programming operation was successful; however, it is understood that this error handling operation could alternatively be performed in the interface controller 30. If successful, the central controller 10 is instructed to provide a message on the screen 12 indicating such success using the instructions of block 160; otherwise, an error message is provided to the screen 12 by the block 162. Thereafter, program flow continues at block 118 wherein the function select menu is again displayed on the screen 12.

Figure 9:
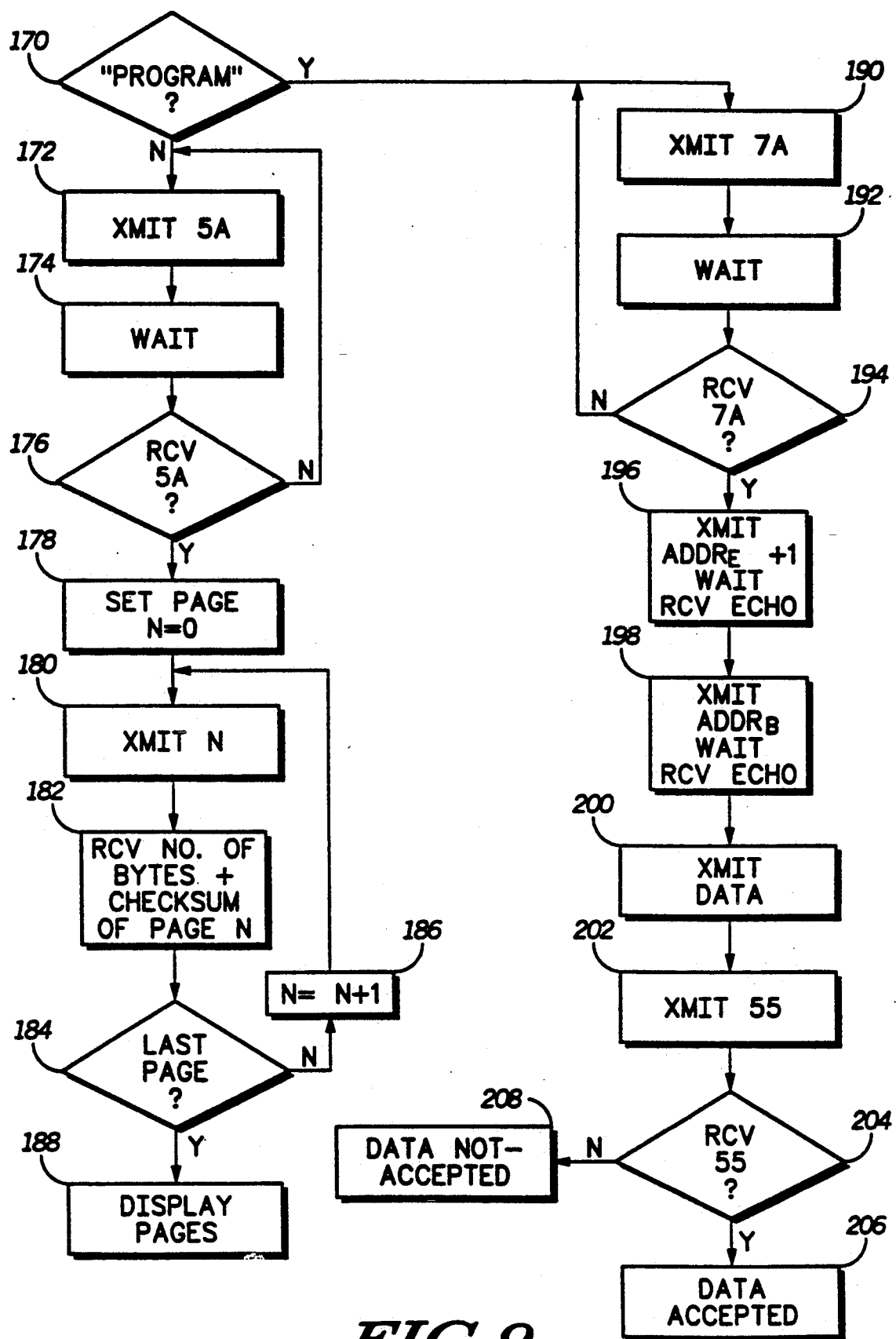
FIG. 9 depicts a flow chart exemplifying a suitable program for the communication between a central controller and a programmer controller when embodied in separate devices.

The flow chart of FIG. 9 exemplifies a suitable program for the embodiment in which the central controller 10 and interface controller 30 are embodied in separate devices to provide command and data word communication therebetween using a conventional communication link 18 as described hereabove. Starting at block 170, it is determined whether the central controller 10 is in a program or read mode. If in a read mode, the program execution begins using the blocks 172, 174 and 176 which form a loop for handshaking purposes, for example. In block 172, a data byte having a particular hex code like 5A, for example, may be transmitted to the controller 30 and thereafter, in block 174, the central controller 10 waits to receive an echo back from the controller 30 of a data byte having the same code. The decisional block 176 makes the decision of whether or not the central controller 10 has received the desired echo byte. If it hasn't, the byte is once again transmitted by block 172 and the blocks 174 and 176 are again executed. This loop continues until the handshaking has successfully transpired and thereafter, program execution continues at block 178.

In the present embodiment, the data read from the pager 20 via controller 30 may be transmitted in page format in which case block 178 sets the page index n to 0 representing the first page. In the blocks 180, 182, 184 and 186, the central controller continues to loop until all of the pages desired to be read are received. Thereafter, by the instructions of block 188, the received pages of code plug data information may be displayed on the screen 12 for the user to view.

Returning to the decisional block 170, in the event that the central controller 10 is in a program mode, a similar handshaking technique is employed using the blocks 190, 192 and 194 wherein the particular byte for transmission and echo may be hex 7A, for example. Once the central controller 10 has obtained the attention of the program controller 30, then the beginning and ending addresses of registers of that portion of the code plug of the pager 20 desired to be programmed are transmitted in the form of data words to the controller 30 using similar echoing techniques by the instructional blocks 196 and 198, respectively. Thereafter, the new data words to be programmed in the selected registers of the code plug are transmitted to the controller 30 by the instructions of the block 200. To determine whether or not the data has been accepted by the controller 30, another coded byte, say hex 55, for example, is transmitted to the controller 30 using the block 202 and the central controller waits for an echo using the decisional block 204. If the controller 30 echoes back the desired code, a data acceptance flag is set by block 206; otherwise, an indication is provided by block 208 that the program data words have not been accepted by the controller 30. The process may then be repeated.

Figure 10:
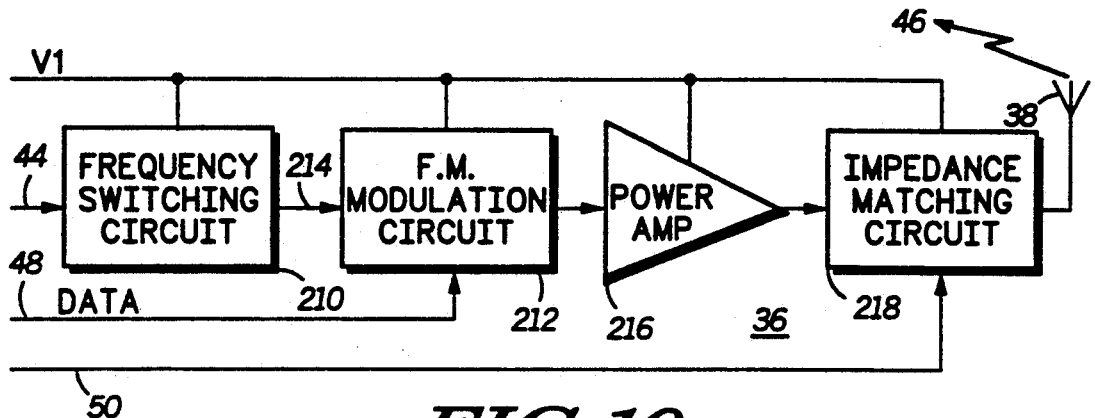
FIG. 10 is a functional block diagram schematic of a transmitting circuit suitable for use in the embodiment of FIG. 3.

A block diagram schematic of a suitable embodiment of a transmitting circuit 36 is shown in FIG. 10. Referring to FIG. 10, a frequency switching circuit 210 is coupled to an FM modulation circuit 212 over a signal line 214. The modulation circuit 212 drives the antenna 38 (39) through a power amplifier 216. Disposed between the antenna 38 and amplifier 216 is an impedance matching circuit 218 to provide the antenna 38 with proper impedance for signal transmission. The signal 44 generated by the controller 30 governs the frequency switching circuit 210 to control the intermediate frequency (IF) of the carrier of the modulation circuit 212. Properly formatted digitally coded data generated by the controller 30 and provided over signal line 48 is used to digitally modulate the IF carrier for transmission to the pager 20 via power amplifier 216 and antenna 38. Another signal 50 generated by the controller 30 governs the selection of antenna impedance through the circuit 218 to correspond to the selected IF carrier frequency controlled by the switching circuit 10. Power may be supplied to the various circuits 210, 212, 216 and 218 by the one or more voltage supply lines V1 controlled by the power switch 68.

Figure 11:
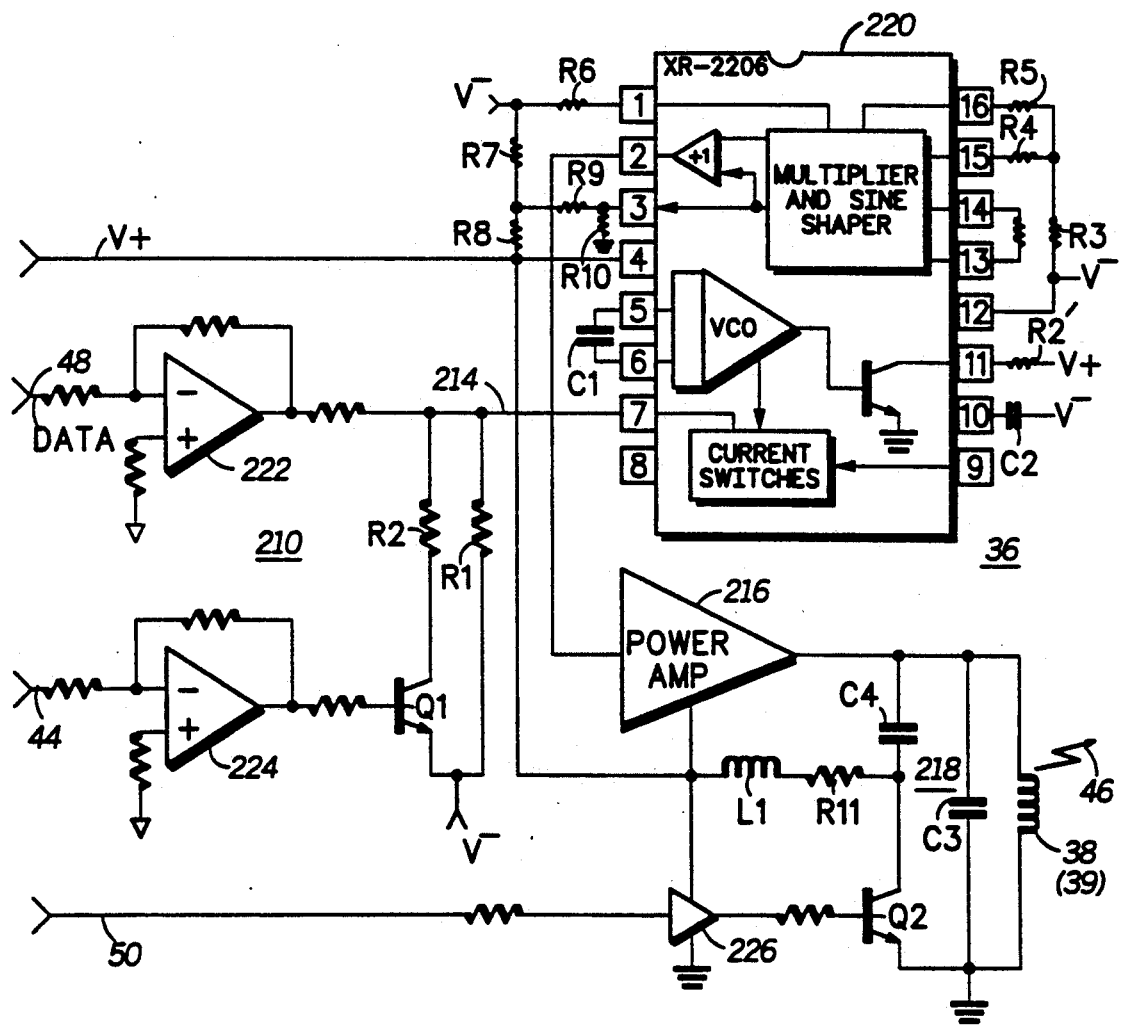
FIG. 11 is a circuit schematic suitable for embodying the transmitting circuit functionally depicted in FIG. 10.

More particularly, a suitable circuit embodiment of the transmitting circuit 36 is depicted in FIG. 11. Referring to FIG. 11, the modulation circuit 212 may be implemented by a monolithic function generator circuit 220 which may be of the type manufactured by EXAR Integrated Systems, model number XR-2206, for example. Such a circuit may be fabricated in a 16-pin chip as is well known to the industry. Serialized digital data from signal line 48 may be coupled to modulation input pin 7 of the circuit 220 through a conventional inverting amplifier configuration 222 utilizing an operational amplifier.

Still referring to FIG. 11, the frequency switching circuit 210 comprises a conventional inverting amplifier circuit 224 of the operational amplifier variety which is governed by the signal line 44 coupled to an inverting input thereof. The switching circuit 210 further includes a resistor R1 coupled between pin 7 and a negative voltage potential V− (see below) and a resistor R2 coupled between pin 7 and V− through a switching transistor Q1 which is driven by the amplifier circuit 224. In addition, a timing capacitor C1 is coupled between the pins 5 and 6 of the circuit 220.

For the present embodiment, the power supply lines V1 comprise a positive voltage supply V+ and a negative voltage supply V−. The positive voltage supply is coupled directly to pin 4 and indirectly to pin 11 through a resistance R2. The negative voltage supply is coupled directly to pin 12 and indirectly to pins 15, 16 and 1 through corresponding resistors R3, R4, R5 and R6. Still further, pin 10 of the circuit 220 is coupled through another capacitor C2 to the negative voltage supply. A resistor divider network is formed by resistors R7 and R8 between the negative and voltage supplies and the connecting node thereof is coupled to pin 3 of circuit 220 through another resistor R9. Pin 3 is also connected through a resistor R10 to ground potential.

Also in FIG. 11, the output on pin 2 of the circuit 220 is coupled through the power amplifier 216 to drive the at least one antenna 38 (39) which may be a ferrite-core coil, for example. In addition, the impedance matching circuit 218 may comprise a capacitor C3 coupled across the antenna 38 to ground and another capacitor C4 coupled across the antenna through another switching transistor Q2 to ground. The control signal 50 is coupled through a circuit arrangement 226 to drive the transistor Q2. Further, the positive voltage supply is coupled directly to the power amplifier 216 and circuit configuration 226 and also indirectly through the series combination of choke coil L1 and resistor R11 to the collector of the switching transistor Q2.

In operation, a digital signal generated by controller 30 and conducted over signal line 44 through the circuit 224 either causes the transistor Q1 to be shorted or blocked. In the blocked state, the combination of timing capacitor C1 and resistor R1 sets the IF carrier frequency of the modulation circuit 220 to be on the order of 35 KHz, for example. When the transistor Q1 is shorted by the signal 44, the timing capacitor C1 and the parallel combination of resistors R1 and R2 are combined to set the IF carrier frequency which may be on the order of 455 KHz, for example. Also, the antenna impedance may be similarly set to match the carrier frequency utilizing the signal line 50, circuit combination 226 and switching transistor Q2. For example, when transistor Q2 is opened circuited, the capacitor C3, taken together with the at least one coil 38 (39), forms the matched impedance. Likewise, when the transistor Q2 is shorted, it is the parallel combination of capacitance C3 and C4, taken together with the coil 38 (39), which forms the matched impedance.

In this manner, the control lines 44 and 50 generated by the controller 30 may set the proper parameters of the transmitting circuit 36 in accordance with the particular pager 20 being programmed. Once the parameters are set, the controller 30 generates the digital data properly formatted in accordance with the reception protocol of the pager over signal line 48. This digital data is amplified by the amplifier circuit 222 prior to modulating the preset carrier frequency of the modulation circuit 220, which modulated signal is coupled to the power amplifier 216 to drive the at least one antenna coil 38 (39) which radiates the programming signal 46 to the pager 20.

Figure 12:
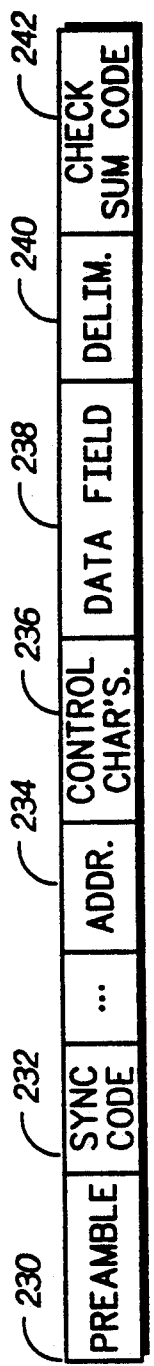
FIG. 12 is an illustration of a reception protocol of a pager based on a POCSAG format.

A typical reception protocol for a POCSAG pager is shown in the illustration of FIG. 12. This format includes a preamble code 230 followed by a sync code 232. Thereafter, the address code of the pager is transmitted in a proper frame 234 corresponding to the particular pager being programmed. The address 234 is followed by a field 236 of control characters which may include the pager's password and command codes among other information. Following the field 236 may be a data field 238 which may include the starting and ending addresses of registers of the pager's code plug where data is to be read from or written into and may further include the new data words for programming purposes. The data field 238 may be followed by one or more delimiters at 240 and then a checksum coded word 242 which may be used by the pager for conventional error detection purposes. For those cases in which the data field 238 is fixed, the delimiter at 240 may not be included in the page message.

Figure 13:
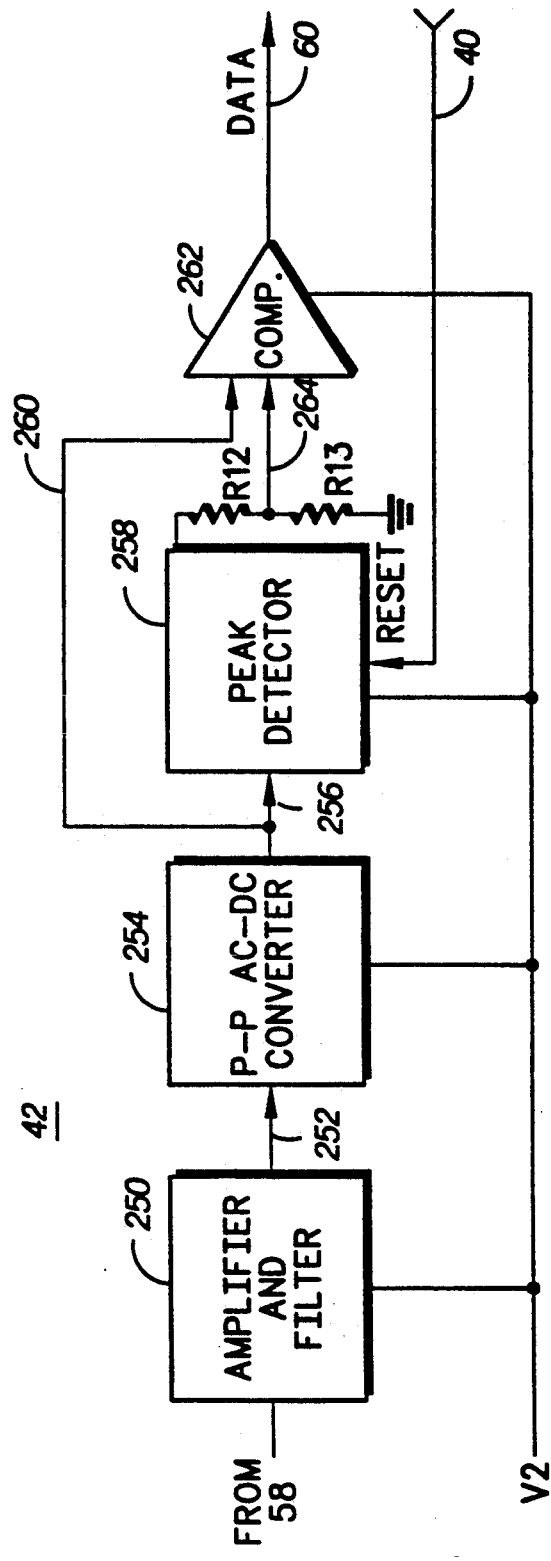
FIG. 13 is a functional block diagram schematic of a receiving circuit suitable for use in the embodiment of FIG. 3.

A suitable embodiment for the receiving circuit 42 is shown in the block diagram schematic of FIG. 13. Audio signals 52 representing data words are emitted from the pager 20 and are detected and converted into electrical signal representations by a selected one of the plurality of microphones 54 and 56 via switch 58. The electrical signal representations are coupled from switch 58 to an amplifier and filter circuit 250 which is, in turn, coupled over signal line 252 to a peak-to-peak AC to DC converter circuit 254. The output of the converter circuit 254 is coupled over signal line 256 to a peak detector circuit 258 which may include a hold circuit and also over signal line 260 to one input of a comparator circuit 262. The peak detector circuit 258 may be coupled to a resistor divider network comprising resistors R12 and R13 and the node connection thereof is coupled to another input of the comparator circuit 262 over signal line 264. The comparator circuit 262 forms the digital data words from a comparison of the amplitude levels of the signals generated by the circuits 254 and 248, which data words are conducted to the controller 30 over signal line 60. A reset signal generated by the controller 30 may govern the operation of the peak detector circuit 258 via signal line 40. In addition, voltage supply signals V2 may be coupled to the circuits 250, 254, 258 and 262 as controlled by the power switch circuit 68.

Figure 14:
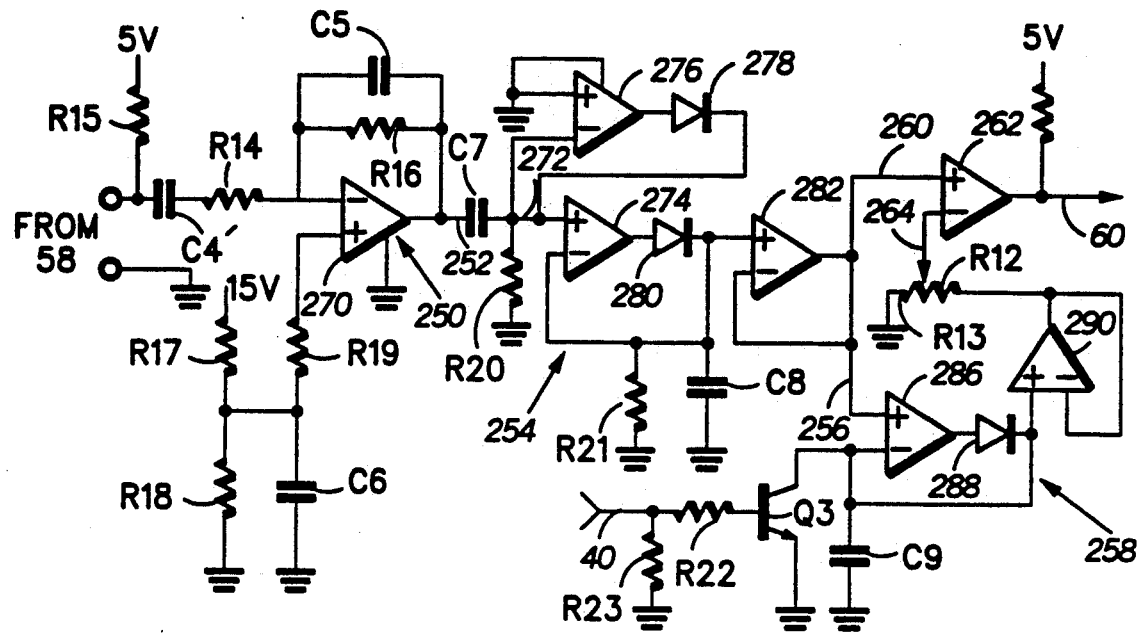
FIG. 14 is a circuit schematic suitable for embodying the receiving circuit depicted in FIG. 13.

More particularly, a suitable circuit embodiment of the receiving circuit 42 is shown by the circuit schematic depiction of FIG. 14. Referring to FIG. 14, the signal line from switch 58 may be coupled through a series combination of capacitor C4 and resistor R14 to an inverting (−) input of an operational amplifier 270. The input line may also be coupled to a positive voltage, say 5 volts, for example, through a resistor R15. A parallel combination of capacitor C5 and resistor R16 may be coupled from the (−) input to the output of the amplifier 270 to control gain and filter response. In addition, a resistor divider network comprising resistors R17 and R18 may be coupled between another voltage supply, say 15 volts, for example, and ground potential and the connecting node thereof may be coupled to a connecting node of a series connection comprising capacitor C6 and resistor R19 which are coupled between the non-inverting (+) input of the amplifier 270 and ground potential. The foregoing described circuit configuration provides the amplifying and filtering function 250 for the electrical signal representations conducted from the selected microphone 54 or 56.

The output signal of the circuit 250 is coupled over signal line 252 through a coupling capacitor C7 to a signal line 272 which is coupled to a non-inverting (+) input of another operational amplifier 274. The signal line 272 is coupled through another resistor R20 to ground potential and also to an inverting (−) input of another operational amplifier 276. The non-inverting (+) input of the amplifier 276 is coupled to ground potential and the output thereof is coupled through a diode 278 (anode-to-cathode) back to the signal line 272. The output of the amplifier 274 is coupled to the anode of another diode 280 and the cathode thereof is coupled back to the (−) input of amplifier 274 and also to an (+) input of another operational amplifier 282 which is configured as a unity gain follower circuit. Still further, the (−) input of amplifier 274 is coupled to ground through a parallel combination of capacitor C8 and resistor R21. The foregoing described circuit configuration is suitable for embodying the converter function 254 of the receiving circuit 42.

Still referring to FIG. 14, the output of the circuit 254 is coupled over signal line 260 to a non-inverting (+) input of another operational amplifier which functions as the comparator 262 and also over signal line 256 to a non-inverting (+) input of another operational amplifier 286. The output of the amplifier 286 is coupled to the anode of another diode 288 and the cathode thereof is coupled back to the (−) input of amplifier 286 and also through capacitor C9 to ground potential. The cathode of diode 288 is also coupled to a unity gain follower circuit comprising another operational amplifier 290. The foregoing described circuit configuration is suitable for performing the peak detection and hold function of the detector 258 as described in connection with the embodiment of FIG. 13.

Still referring to FIG. 14, a reset circuit comprising a transistor Q3 and resistors R22 and R23 is coupled between the (−) input of the amplifier 286 and the signal line 40. In operation, when the reset signal is generated by the controller 30 over signal line 40, it causes the output of the amplifier 290 to be set to a predetermined amplitude level which, in the present embodiment, happens to be approximately ground potential. In addition, any charge accumulated on the capacitor C9 will be discharged through transistor Q3 to ground until the voltage across C9 is stabilized to approximately ground potential. Conversely, when the reset signal is removed, the amplifier 286 becomes active to establish dynamically from the amplitude levels of the electrical signal representations a new peak voltage across the capacitor C9 and ultimately at the output of the operational amplifier 290 which is coupled through an adjustable potentiometer, the wiper of which forming the resistor divider network R12 and R13. The wiper in the present embodiment is coupled over signal line 264 to the (−) input of the comparator circuit 262. The output of the comparator circuit 262 is coupled over signal line 60 to the controller 30 for providing the recovered digital data word thereto.

Figure 15:
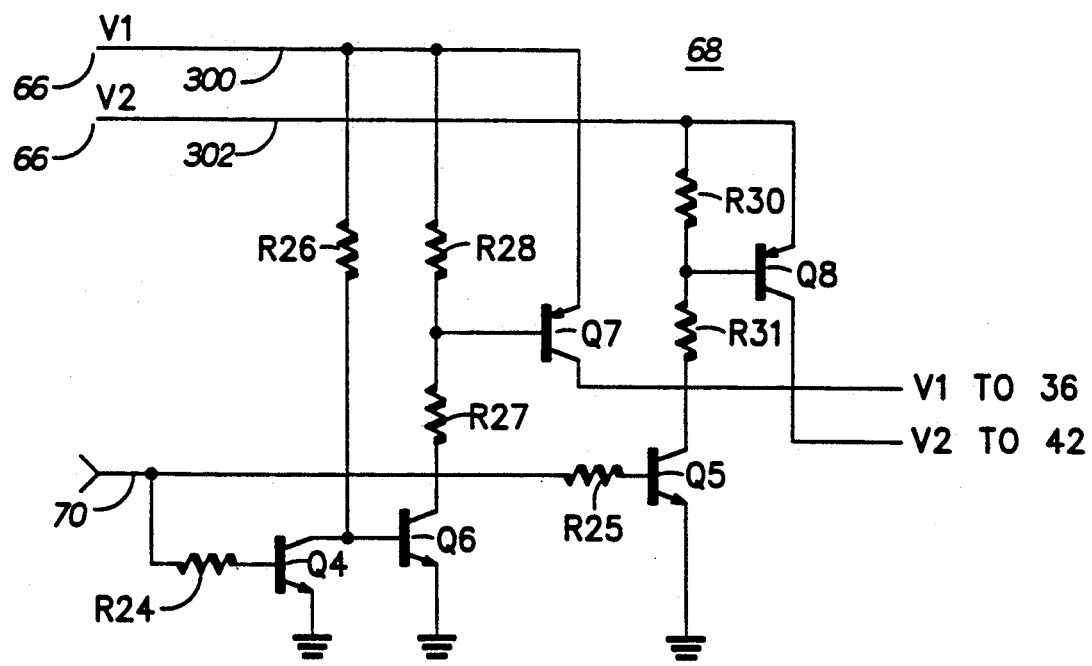
FIG. 15 is a circuit schematic of a power switch circuit suitable for use in the embodiment of FIG. 3.

A suitable circuit embodiment of the power switch 68 is shown in FIG. 15. Voltage supplies denoted as V1 and V2 provided by the regulation circuit 62 over signal lines 66 are coupled to the signal lines 300 and 302, respectively. The control signal over signal line 70 may be coupled to the bases of transistors Q4 through resistor R24 and Q5 through resistor R25. The collector of transistor Q4 is coupled to the base of another transistor Q6 and also to the power line 300 through a resistor R26. The emitters of the transistors Q4, Q5 and Q6 are all coupled to ground potential. The collector of transistor Q6 is coupled to the power line 300 through a series resistor network comprising resistors R27 and R28 and the connecting node thereof is coupled to the base of another transistor Q7.

Similarly, the collector of transistor Q5 is coupled to the power line 302 through a series resistor network comprising resistors R30 and R31 and the connecting node thereof is coupled to the base of another transistor Q8. The emitter of transistors Q7 and Q8 are coupled to the power lines 300 and 302, respectively, and the collectors thereof provide the voltage signals to the circuits 36 and 42, respectively.

In operation, when the controller 30 generated signal over line 70 causes transistors Q4 and Q5 to be non-conducting, transistor Q8 becomes non-conducting, thus blocking the power supply to the receiving circuit 42. Concurrently, transistor Q6 becomes conducting which causes transistor Q7 to conduct which provides power supply to the transmitting circuit 36. Conversely, when the signal over line 70 causes transistors Q4 and Q5 to be conducting, the transistor Q8 becomes conducting and allows power to flow to the receiving circuit 42. Concurrently, transistor Q6 is blocked causing Q7 to become non-conducting, thus preventing power from being supplied to the transmitting circuit 36. In this manner, the controller 30 may control power supply to the receiving circuit 42 when it expects to receive signals emitted from the pager 20 and simultaneously, block power supply to the transmitting circuit 36 so as to alleviate electrical interference coupling from the transmitting circuit 36 to the receiving circuit 42 during the reception period to prevent corruption of the received signals.

Figure 16:
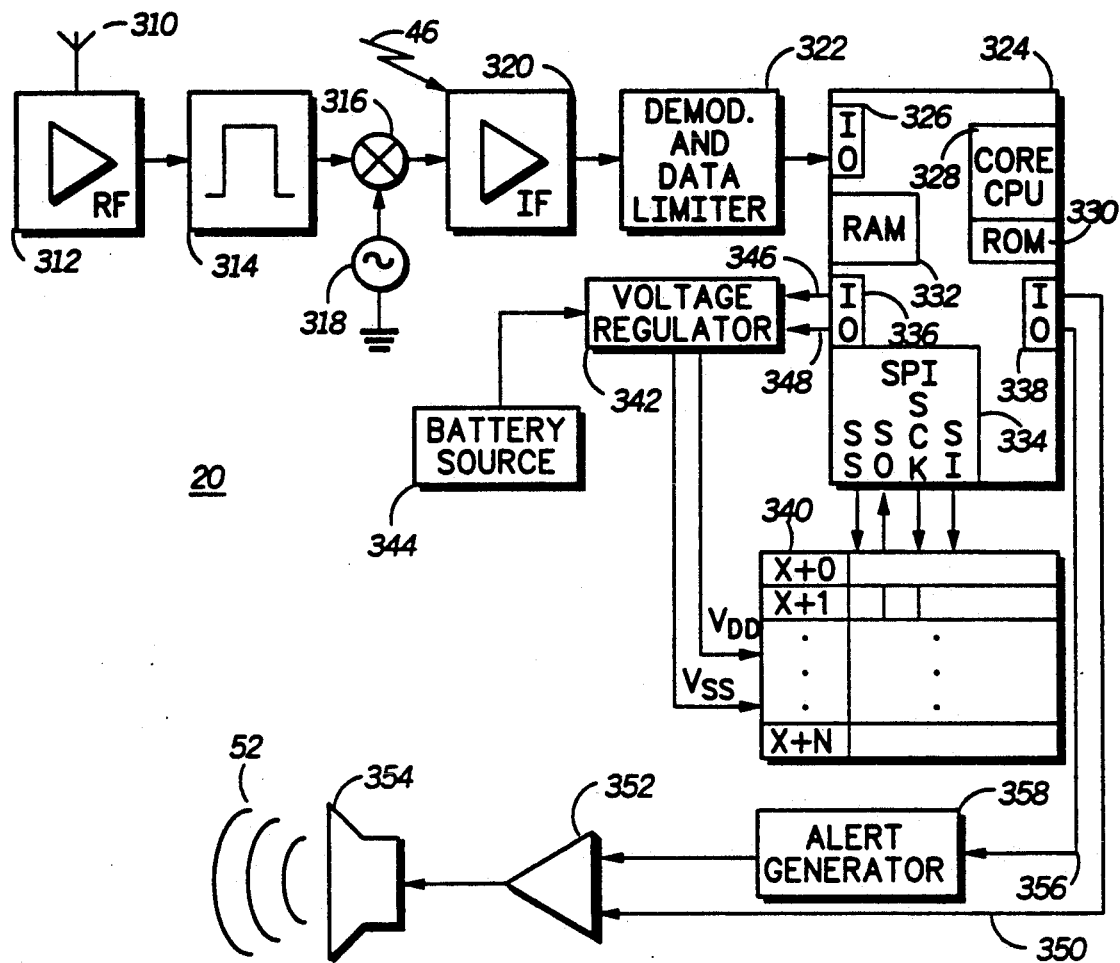
FIG. 16 is a block diagram schematic embodiment of a pager suitable for use with the programming system depicted in FIG. 3.

A block diagram schematic of an embodiment of a pager suitable for use with the programmer 16 as described hereabove is shown in FIG. 16. Referring to FIG. 16, an antenna 310 is coupled to an RF amplifier stage 312 which in turn is coupled to an RF bandpass filter stage 314. The output of the filter 314 is mixed in a mixer 316 with a signal generated from a local oscillator 318 to effect an intermediate frequency (IF) signal which is coupled to an IF amplifier stage 320. The output of the stage 320 is coupled to a conventional demodulation and data limiter stage 322 which recovers the digitally coded information from the IF signal and conducts it to the pager's controller 324 through a conventional input/output (I/O) port 326 thereof. The pager's controller 324 may be a microcomputer of the type manufactured by Motorola, Inc., model number MC68HC05C4 or MC68H05L6, for example. Refer to the Motorola Technical Publication ADI991R2 incorporated by reference herein, supra, for more details.

The microcomputer 324 may include the conventional elements of a core CPU 328, a read only memory (ROM) 330, a scratch pad or window random access memory (RAM) 332, a serial port interface (SPI) 334 and a plurality of input/output ports 326, 336 and 338 among other things. The ROM 330 may be used to store the various application programs for operating the pager through its conventional functions which will be described in greater detail hereinbelow. The RAM 332 may be used for temporary storage of command and data words for processing by the CPU 328.

A non-volatile memory or code plug 340 which may be of the type manufactured by Motorola, Inc. having a model number MCM2814, for example, is coupled to the microcomputer 324. In the present embodiment, the SPI 334 of the microcomputer 324 is utilized for communicating with the code plug 340 through the signal lines SS, SO, SCK, and SI. The code plug 340 includes a plurality of registers denoted by the addresses X+0, X+1, ..., X+n, for storing a corresponding plurality of data words which are used to characterize the operations of the pager as controlled by the controller 324.

A conventional voltage regulator 342 regulates the voltage level of power from a battery source 344 of the pager to provide regulated voltage supplies, like $V_{DD}$ and return $V_{SS}$, for example, to the code plug 340. Control lines 346 and 348 are coupled from the I/O port 336 of the controller 324 to the voltage regulator 342 to switch on and off the supply voltage to the code plug 340 and provide adjustment thereof as will become more evident from the following description.

In addition, another control line 350 may be coupled from the I/O port 338 of the controller 324 to an audio amplifier 352 which drives a conventional audio transducer 354 to produce the audio signals described as 52 hereinabove. Alternatively, a control signal 356 may be coupled from the I/O port 338 to a conventional alert generator 358 which is used to govern the audio signal generation of the elements 352 and 354. While in the present embodiment the alert generator 358 is shown external to the controller 324, it is understood that it may also be integrated on the same substrate thereof without deviating from the principles of the present invention.

Figure 17:
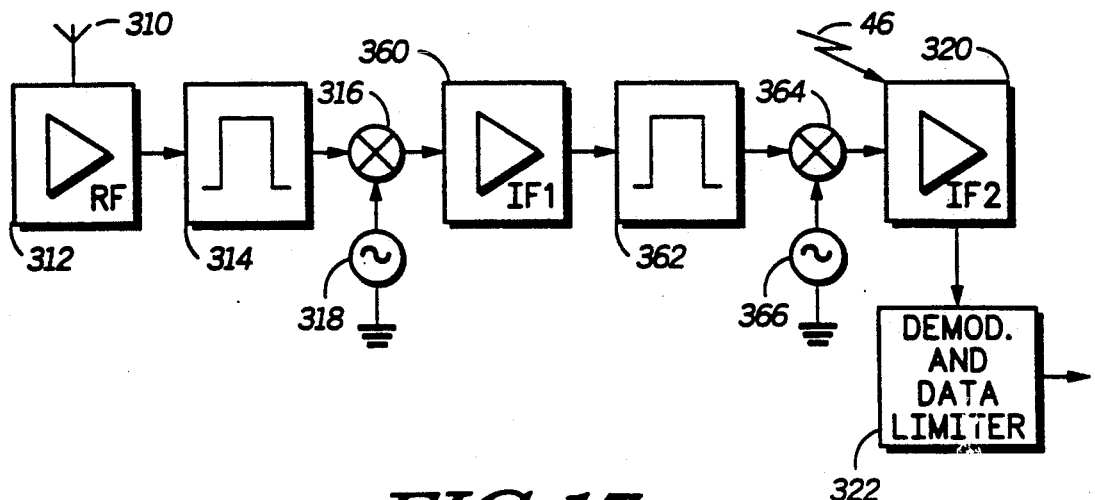
FIG. 17 is a block diagram schematic of an alternate embodiment of a receiving section for use in the pager embodiment of FIG. 16.

While the pager embodiment described in connection with the block diagram schematic of FIG. 16 depicts only a single mixer stage receiver section, it is understood that the receiver section of the pager may include multiple mixer stages in the super heterodyning operations thereof before reaching the desired intermediate frequency for use in the demodulation and data limiter functions. The block diagram schematic of FIG. 17 exemplifies a receiver section of a pager employing two mixer stages. The intermediate mixer stage includes another IF amplifier section 360 which is coupled in turn to another bandpass filter section 362. The output of the filter 362 is mixed in another mixer stage 364 with an oscillation signal generated by another local oscillator 366 prior to yielding the desired IF signal which is coupled to the IF amplifier stage 320.

In the pager embodiment of FIG. 16, the super heterodyning process may reduce the RF carrier signal received by the antenna 310 to an IF signal of approximately 35 KHz which is coupled to the amplifier stage 320. Accordingly, the IF amplifier stage 320 in this case is tuned to be most sensitive to IF signals on the order of 35 KHz. On the other hand, the two mixer stage receiver section embodiment described in connection with FIG. 17 may perform a super heterodyning process to reduce the received RF signal at the antenna 310 to a IF signal of a frequency on the order of 455 KHz which is coupled to the IF amplifier stage 320. In this case, the IF amplifier stage 320 is tuned to be most sensitive to frequency signals on the order of 455 KHz.

Consequently, the programming signals 46 radiated by the programmer 16 are selected based on the tuned intermediate frequency sensitivity of the IF stage 320 of the particular pager being programmed. Accordingly, the programming signal 46 radiated from the programmer 16 at the appropriate carrier frequency of the pager being programmed will be received by the IF stage 320 and demodulated by the downstream stage 322 to recover the digitally coded data thereof which is passed on to the controller 324.

Figure 18A:
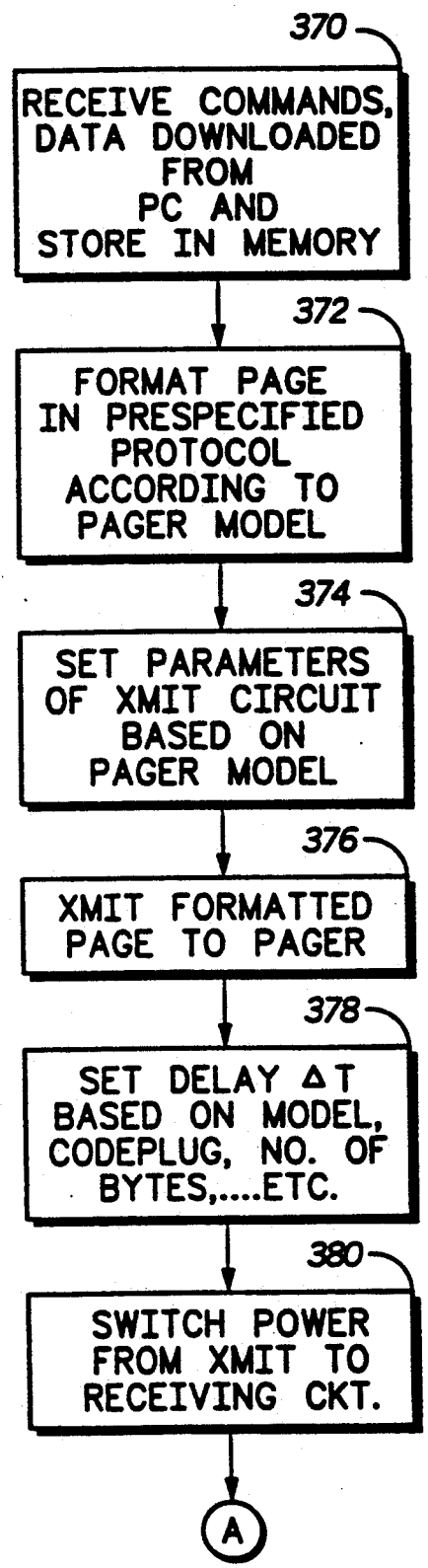
FIGS. 18A and 18B together form a flow chart exemplifying the programmed operation of the controller of the programmer embodiment depicted in FIG. 3.
Figure 18B:
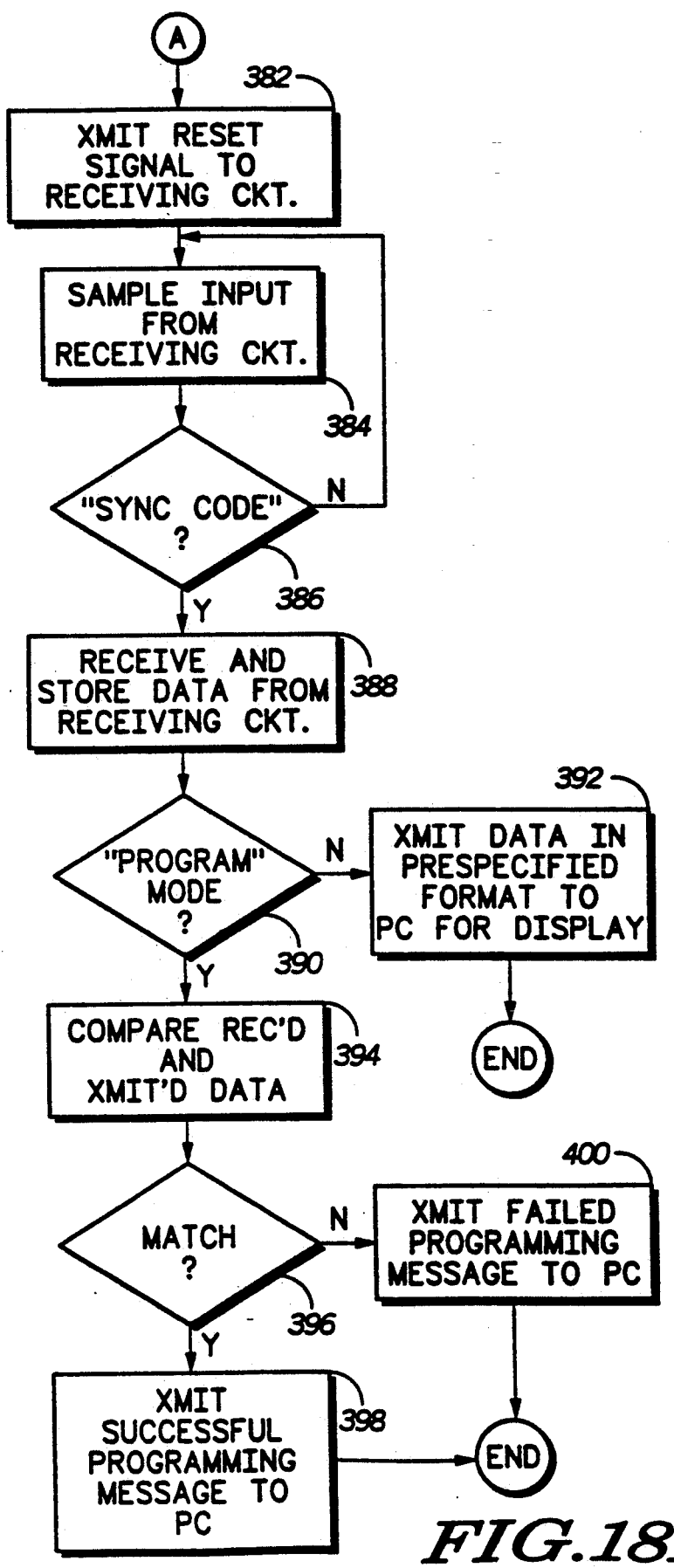

The flow charts of FIGS. 18A and 18B exemplify the programmed operation of the controller 30 in programming or reading the code plug 340 of the pager 20. In following the flow charts of FIGS. 18A and 18B, reference may be made to the block diagram schematic embodiment of the programmer 16 shown in FIG. 3. Referring to FIG. 18A and starting with the block 370, command and data words may be downloaded from the personal computer 10 over the communication link 18 and received by the controller 30 using communication techniques similar to those described in connection with the flow chart of FIG. 9 hereabove and such command and data words may be stored in a memory of the controller 30. In the event that the command and data words have not been formatted by the personal computer 10 when received by the controller 30, the controller 30 may format a page for transmission to the pager 20 in the prespecified reception protocol according to the model of the pager per the instructions of block 372 (refer to FIG. 12). Thereafter, the controller 30, in accordance with the instructions of block 374, may select the appropriate IF carrier and matching impedance of the transmitting circuit 36 based on the model of the pager being programmed utilizing signal lines 44 and 50 as described hereabove. The controller 30 may also provide power (V1) to the transmitting circuit 36 via power switch 68 utilizing the control signal 70.

According to the instructions of block 376, the controller 30 serially provides the formatted page including the command and data words to the transmitting circuit 36 over signal line 48 for transmission thereby via antenna 38 (39) and programming signal 46. An example of such a formatted programming signal is shown in the diagram of FIG. 12. In the following block 378, the controller 30 sets a time delay $\Delta T$ based on a variety of factors including the model of the pager being programmed, the type of code plug implemented therein, the number of bytes in the transmission, . . . etc.

After waiting through the delay period, the controller, in accordance with the instructions of block 380, controls the power switch 68 via control signal 70 to switch power from the transmitting circuit 36 to the receiving circuit 42. That is, during the period when the programmer 16 is receiving audio signals from the pager 20, the transmitting circuit 36 may be disabled and the receiving circuit 42 enabled. In block 382, the controller 30 transmits a reset signal over signal line 40 to the receiving circuit 42 to reset the peak detection and hold circuit thereof to allow it to dynamically adjust to a new amplitude threshold level in accordance with the amplitudes of received audio signals. The receiving circuit 42 is now set to receive audio signals from a selected one of the microphones 54 and 56 via switch 58 and recover the digitally coded data thereof which is conducted to the controller 30 over the data line 60.

The instructional block 384 and decisional block 386 together form a loop in which the controller 30 samples the data line 60 for a particular sync code which it is programmed to recognize in order to set the reception timing and commence processing of the received data words from the pager 20. Once the sync code is received, the instructions of block 388 are executed which permit the controller 30 to receive and store the data words recovered by the receiving circuit 42 over signal line 60.

Thereafter, the controller 30 determines whether it is in a program mode or a read mode using the decisional block 390. If in a read mode, program execution branches to the instructions of block 392 wherein the controller 30 is instructed to transmit the received data in a prespecified format to the personal computer 10 over the communication link 18 for display on the screen 12 thereof. On the other hand, if the controller 30 is in the program mode as determined by block 390, the program execution will continue at block 394 wherein a verification operation may be performed. It is understood that such verification may be alternatively handled by controller 10. More specifically, the instructions of block 394 direct the controller 30 to compare the received data words from the pager 20 (i.e. read from the code plug 340 thereof) with those transmitted thereto in order to determine whether or not there is a match. If a match is determined by the decisional block 396, a successful programming message may be communicated to the personal computer 10 via communication link 18 for display to the user; otherwise, if no match, a failed programming message is transmitted to the personal computer 10 to advise the user to repeat the operation or investigate the possibility of a malfunction in either the programmer 16 or pager 20. Thereafter, the programming and/or reading operations of the controller 30 in connection with the pager 20 may be suspended.

The flow charts of FIGS. 19A, 19B, 20, and 21 exemplify the programmed operations of the controller 324 of the pager 20 as described in connection with the embodiment depicted in FIG. 16. Summarizing, the transmitting circuit 36 of the pager 16 transmits a programming signal 46 to the pager 20 as directed by the controller 30. The programming signal 46 is formatted in accordance with the reception protocol of the pager being programmed. An exemplary page format has been described hereabove in connection with the illustration of FIG. 12. The programming signal 46 is received by the IF amplifier stage 320 and conducted to the demodulation and data limiter stage 322 to recover the digitally coded information which is passed on to the controller 324 through the I/O port 326.

Figure 19A:
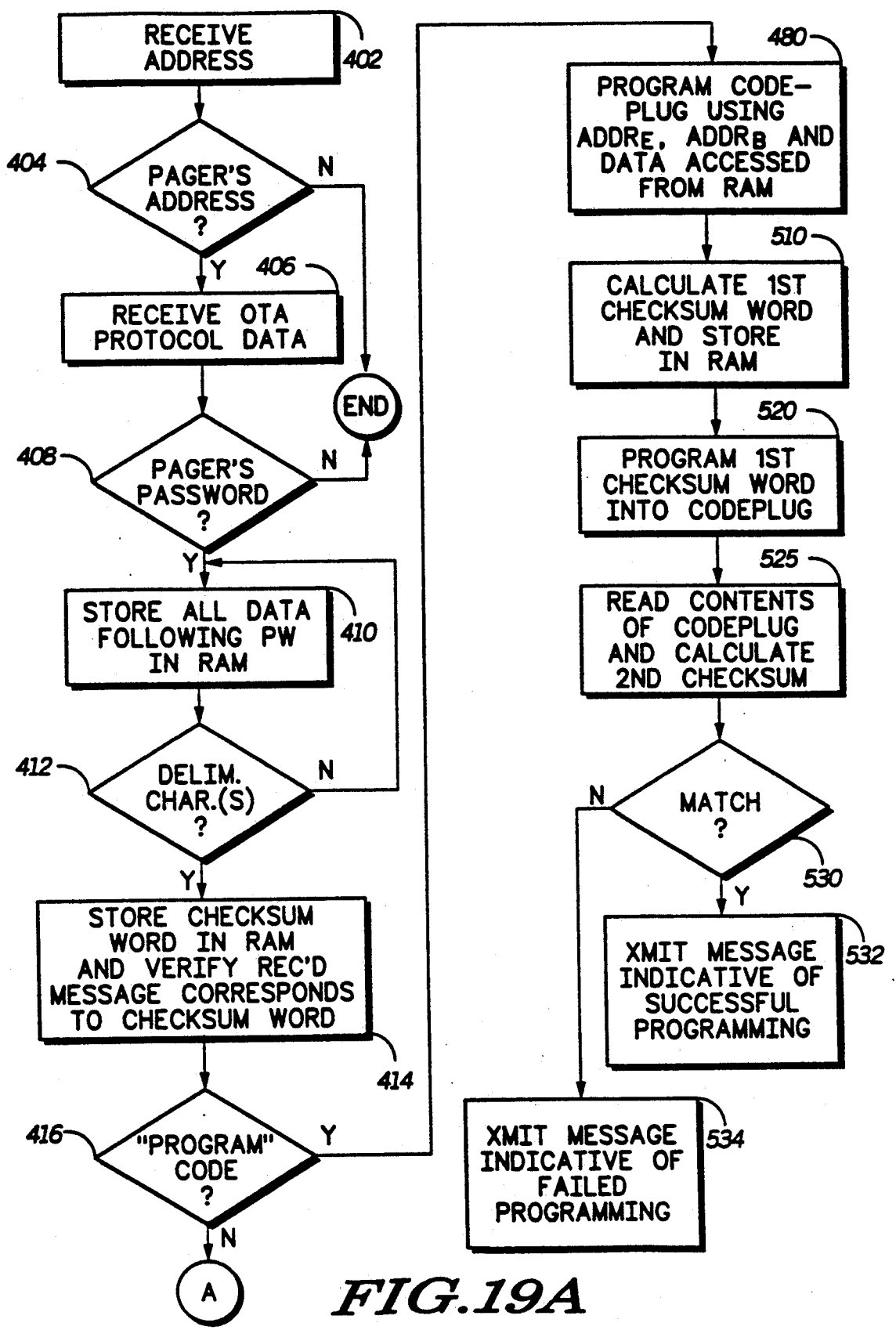
FIGS. 19A, 19B, 20 and 21 are flow charts exemplifying the programmed operations of a controller of the pager embodiment as depicted in FIG. 16.

Referring to FIG. 19A, the controller 324 is instructed to receive the pager address portion of the formatted page in accordance with the instructions of block 402 and determine in decisional block 404 whether or not it is one of the pager's preprogrammed addresses. If it is determined not to be a pager address, the program execution is terminated. Otherwise, if the formatted programming signal contains a password, the password is received and checked in the blocks 406 and 408. In the event the password is not proper, the program execution will be terminated. With the proper password, the controller 324 is instructed to store the control characters 236 (command) and data in the data field 238 by the block 410 until it receives the delimiting characters 240 which is determined by the block 412. Step 412 may be deleted in an embodiment having a fixed data field. The checksum word 242 which follows the delimiting characters of the formatted page is also stored in RAM 332 and a verification routine is carried out by the block 414 to establish the validity of the message transmitted in the received page using the stored checksum word.

The controller 324 next evaluates the command code of the field 236 in block 416 to determine whether to program data words into or read data words from the code plug 340. If the command code is other than a read or program code as determined by the decisional block 418, the program execution may be branched to other routines as deemed appropriate.

Figure 19B:
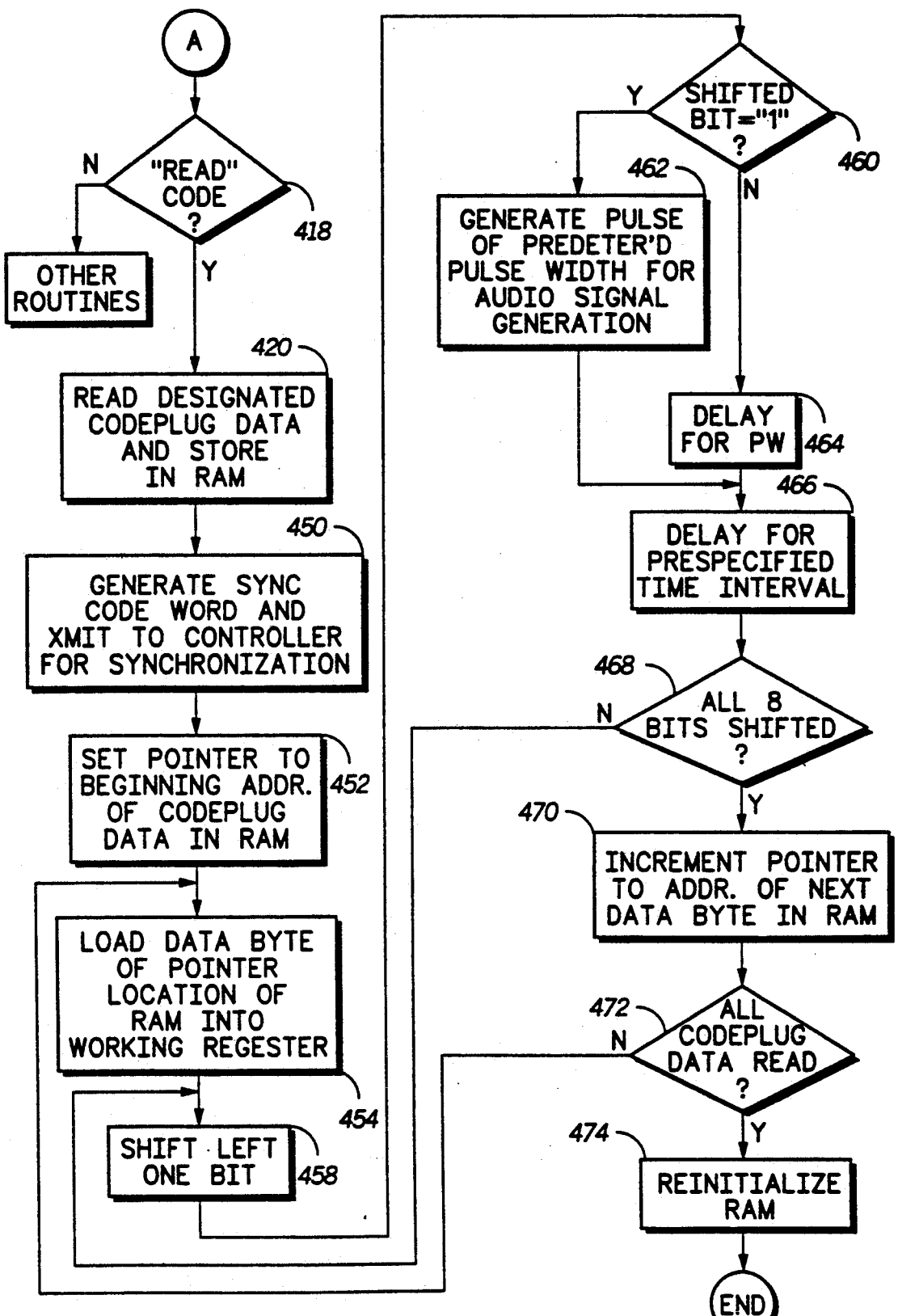

Assuming for the present example that the command code is a read code, then program execution continues at block 420 of FIG. 19B wherein the controller 24 is instructed to read the code plug data designated by code plug addresses which may be contained in the formatted data field 238 of the programming signal 46 and store such data in the RAM 332. The process of reading the code plug 340 of the pager 20 is more fully described in connection with the flow chart of FIG. 20.

Figure 20:
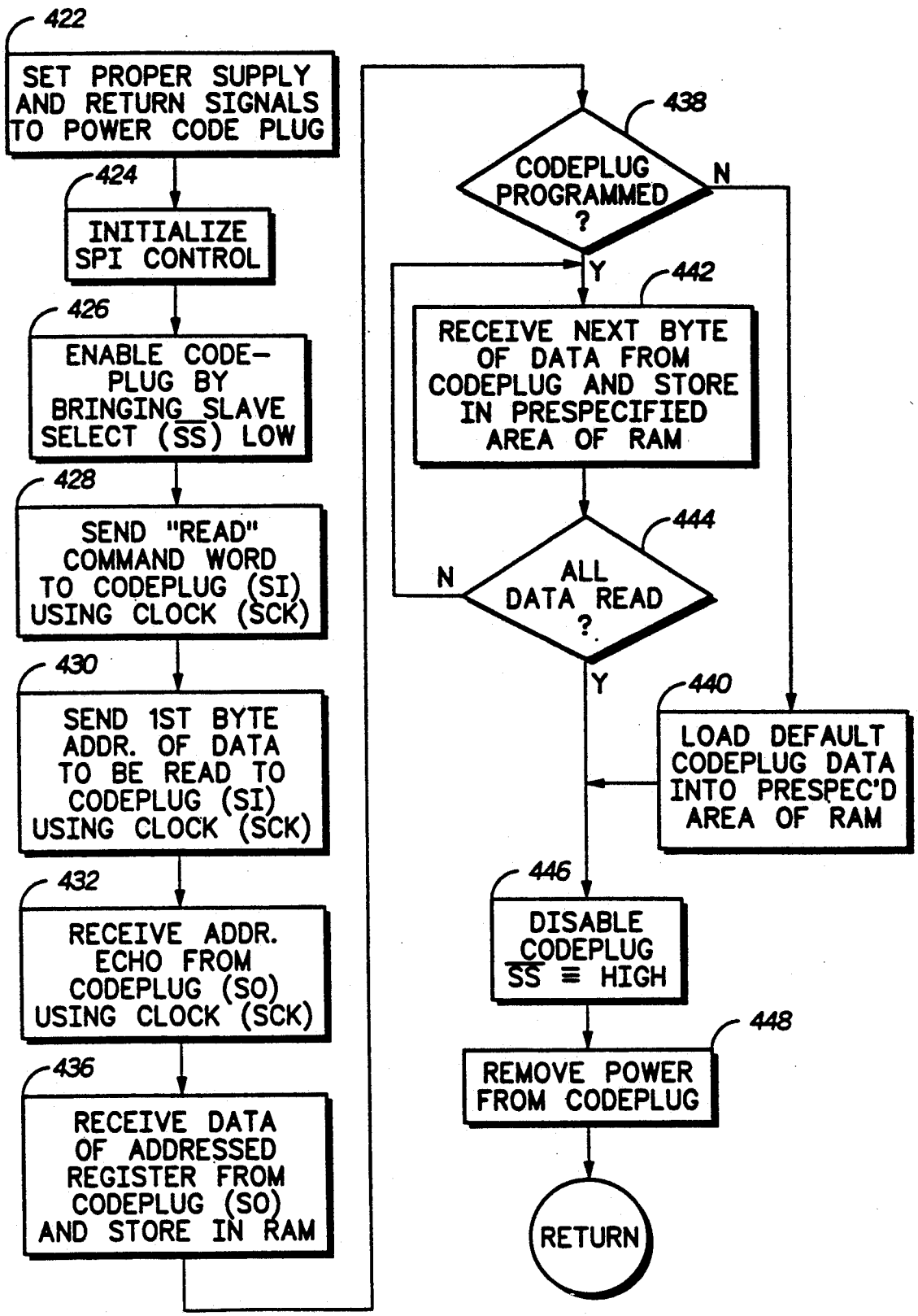
Figure 21:
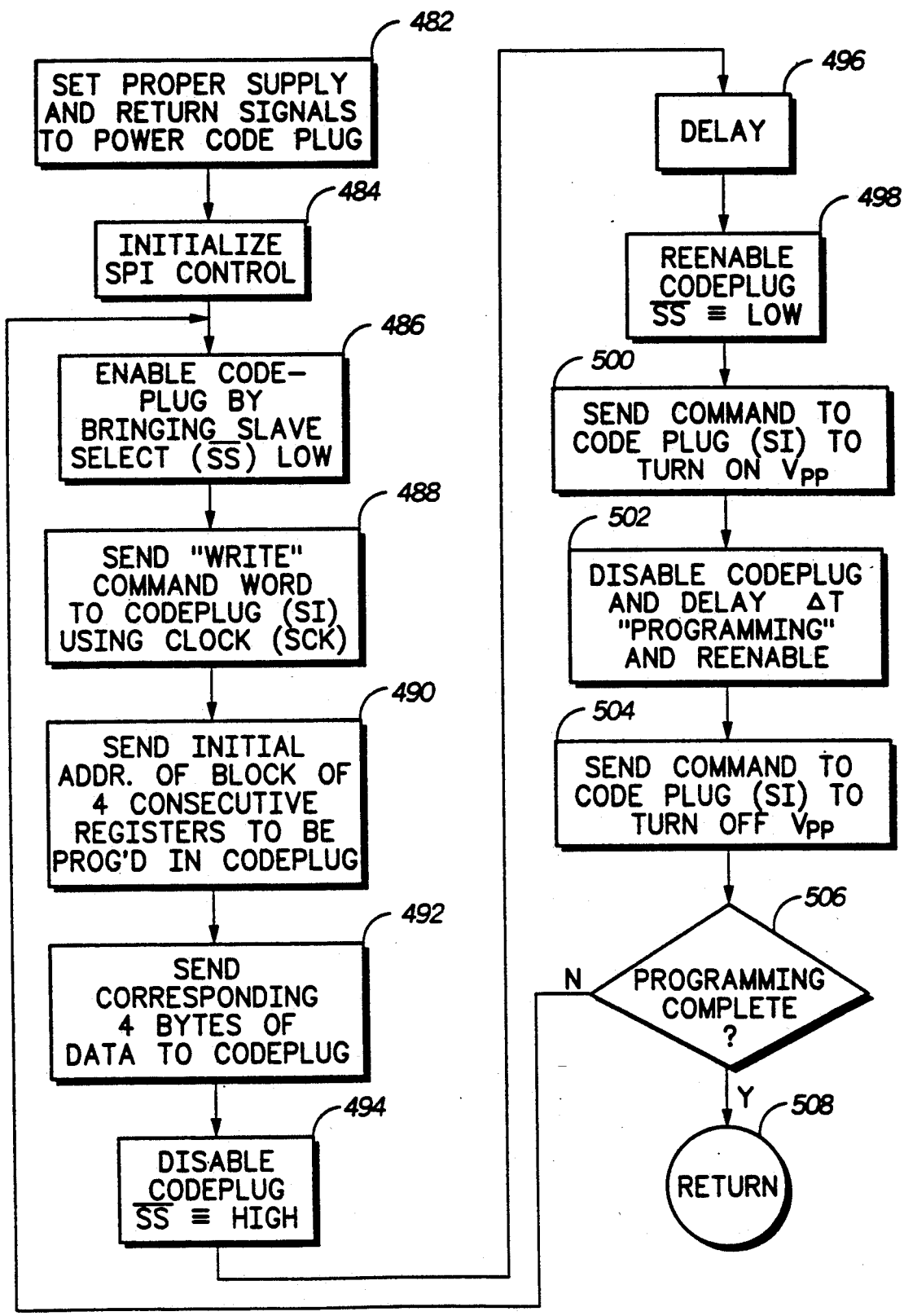

Referring to FIG. 20, in the first block 422, the controller 324 is instructed to set the proper power supply and return signals, $V_{DD}$ and $V_{SS}$, respectively, to power the code plug using the control signals 346 and 348 via voltage regulator 342. In the following block 424, the controller 324 is instructed to initialize the SPI control interface 334 to communicate with the code plug 340. In block 426, the signal SS is instructed to be brought low to enable the code plug 340, and in block 428, a read command word is transmitted to the code plug over the signal line SI using the clock generated by the signal line SCK of the SPI 334.

Thereafter, in block 430, the address of the register storing the first byte of data to be read from the code plug is sent to the code plug 340 using the signal lines SI and SCK. The code plug 340 responds by echoing back the address received using the signal lines SO and SCK, and the controller 324 receives the echoed address in accordance with the instructions of block 432. Program execution continues at block 436 wherein the controller 324 is instructed to receive the data word of the addressed register of the code plug 340 using signal lines SO and store the received data word in RAM 332.

In the decisional block 438, the controller 324 determines whether or not the code plug 340 is programmed from the received data word of the block 436. In the event it is determined that the code plug is not programmed, faulty or missing, default code plug data is loaded into a prespecified area of the RAM 332 in accordance with a default algorithm which is executed by the block 440; otherwise, the controller 324 is instructed by the blocks to continue to receive data words from successive address registers of the code plug 340 and store the received data words into a prespecified area of the RAM 332 until all of the desired data words are read from the code plug 340 as determined by the decisional block 444. Program execution continues after blocks 440 and 444 at block 446 where the code plug is disabled by bringing the signal line SS high. Then, in block 448, power is removed from the code plug utilizing control signals 346 and 348 via voltage regulator 342. Thereafter, program execution is returned to the main algorithm and, which for the present example, resumes at block 450 in FIG. 19B.

In block 450, the controller 324 is instructed to generate a sync code word which is to be transmitted to the controller 30 via receiving circuit 42 of the programmer 16 as a header to the formatted transmission of the data words read from the code plug from block 420. Thereafter, a pointer is set to the address of a register of RAM 332 containing the initial data word to be transmitted acoustically from the pager 20. In the present example, the initial data word or words may be the sync code word which was generated in block 450. Next, in block 454, the data byte of the pointer location of RAM 332 is loaded into a working register and thereafter formatted for acoustic transmission.

The time waveforms of FIG. 22 exemplify the method used by the present embodiment for acoustically communicating between the pager and programmer 16. Referring to FIG. 22, an exemplary data word binarily coded in ones and zeroes is shown in the working register designated by the block 456. Waveform A of FIG. 22 exemplifies the acoustic communication format. Time intervals of waveform A designated by the integers 7 through 0 correspond to the bits of the data word of the working register 456 traversing from the most significant bit (MSB) to the least significant bit (LSB).

Accordingly, if a bit of the data word to be transmitted is in a first binary state, say a "1", for example, then the controller 324 may generate at least one pulse of a predetermined pulse width during the corresponding bit time interval in the transmission format. Conversely, if the bit of the data word is in a second binary state, say a "0", for example, the controller 324 merely delays for a predetermined time interval without generating a pulse. In the present embodiment, the format of waveform A further includes null time periods $\Delta t$ which separate the corresponding bit time periods during which null time $\Delta t$ nothing is generated.

Referring back to the flow chart of FIG. 19B and using the example exhibited in waveform A, the controller 324 in block 458 shifts the data word of the working register 456 left one bit and determines whether or not the bit is a one in decisional block 460 and if so, generates at least one pulse of a predetermined pulse width for audio signal generation in the block 462. Otherwise, the controller 324 is caused to delay for a predetermined pulse width by the instructions of block 464. Thereafter, the controller 324 may be caused to delay for a prespecified time interval which is the null time period $\Delta t$, by the block 466. The decisional block 468 determines whether or not all eight bits of the data word have been shifted through the working register 456. If not, the program execution continues with block 458 to continue shifting and determining the binary state of each bit of the data word.

In the example shown in waveform A of FIG. 22, no pulses are generated for the bit time intervals 7, 4, 2 and and pulses are generated for the corresponding bit time intervals 6, 5, 3 and 1. In the present example, the null time periods $\Delta t$ separate the bit time intervals during the transmission thereof. The pulse train signal representing the data word to be transmitted exemplified by the waveform A is generated by the controller 324 according to the steps 458-464 and conducted over signal line 350 to govern the audio signal generating elements 352 and 354 to emit an audio signal 52 only in response to the generated pulses thereof. Alternatively, the controller 324 may generate the pulse train signal over signal line 356 to activate the alert generator 358 during such pulse periods which in turn causes audio signal generation by the elements 352 and 354 in accordance with the selected alert code of the generator 358.

The other time waveforms B-G of FIG. 22 exemplify the operations of the receiving circuit 42 in response to the pulse coded audio signal emitted from the pager 20 corresponding to time waveform A. Referring to FIG. 14, electrical signal representations from the selected microphone 54 or 56 are provided to the amplifier and filtering circuit 250 and the output thereof over signal line 252 is exemplified by the time waveform B of FIG. 22. A signal exemplified by the time waveform C is effected downstream of the coupling capacitor C7 on signal line 272. A signal resembling the solid line time waveform D may be effected at the output of the operational amplifier 282. The dashed line of time waveform D exemplifies the amplitude threshold level dynamically acquired from the amplitude levels of time waveform D (solid line) using the peak detector circuit 258.

Accordingly, both amplitude levels (solid and dashed) of time waveform D are fed into the comparator 262 which serially forms the corresponding digital data word solely in response to the amplitude levels of its input signals and conducts the serial data word over signal line 60 to the controller 30 for sampled reception thereby as exemplified by the time waveform E. The arrows of the waveform F represent the sampling times of the controller 30. In operation, if there is no pulse during a sampling time, the controller 30 recognizes the binary state as a zero, for example, and if there is a pulse during a sample time, the controller 30 recognizes the bit as a binary one. In this manner, the controller 30 may reconstruct the data byte (as shown in illustration G) acoustically transmitted by the pager 20 and store it in the memory thereof for future operations.

Returning back to the flow chart of FIG. 19B, after the decision has been made that a complete data word has been formatted for acoustic transmission in blocks 468, the program execution continues at block 470 wherein the address pointer is incremented to the address of the next register of the portion of RAM 332 containing the data words read from the code plug 340. Thereafter, the processing steps of 454 through 468 are repeated to format and acoustically transmit the next data word until all of the designated data words read from the code plug have been transmitted as determined by the decisional block 472. Then, in block 474, the RAM 332 is reinitialized.

Referring back to FIG. 19A, if the decisional block 416 determines that the command code is indicative of a programming mode, the program execution continues at block 480 in which the controller 324 is instructed to program the code plug using new data accessed from the RAM 332. Under certain circumstances, the controller 324 may use the beginning and ending addresses, ADDRB and ADDRE, received with the program command. This programming step is described more specifically in connection with the flow charts of FIG. 21. Starting first with block 482 of FIG. 21, the controller 324 is instructed to set the proper supply and return signals, $V_{DD}$ and $V_{SS}$, to the code plug 340 utilizing the control signals 346 and 348. Thereafter, the SPI section 334 is initialized in block 484 and the code plug is enabled by bringing the SS signal low in block 486. The controller 324 is next instructed in block 488 to send a write command word to the code plug 340 over signal line SI using the clock of signal line SCK. In the next instructional block 490, the controller 324 is instructed to send the initial address of a block of four consecutive registers to be programmed in the code plug 340 over signal line SI as controlled by the clock SCK. Thereafter, the corresponding four bytes of data to be programmed into the code plug are conducted thereto in the same manner by the instructions of the block 492. The code plug is then disabled by block 494 and the controller is instructed to delay for a predetermined time by the block 496.

After the delay, the code plug 340 is enabled by the block 498 and a command is sent to the code plug over signal line SI to initiate the programming process by block 500. Thereafter, the block 502 instructs the controller 324 to disable the code plug, again delay for a predetermined time during which the code plug programs itself and thereafter, re-enable the code plug as previously described. In block 504, the controller 324 is instructed to send a command to the code plug 340 via signal line SI to disable the programming state thereof.

In the decisional block 506, it is determined whether or not all of the new data words have been written into the code plug 340. If not, the blocks 486-504 are repeated for each block of four consecutive data words until programming of the code plug is complete. Thereafter, program execution is returned to block 510 of the main program (FIG. 19A) wherein the controller 324 is instructed to calculate a first checksum word for the new data words written into the code plug 340 and in block 520, the controller 324 is instructed to write the first checksum word into the code plug 340 utilizing the same programming steps 486-504 described hereabove. In the block 525, the contents of the code plug may be read by the controller 324 in accordance with the programming steps described in connection with the flow chart of FIG. 20, for example. During the reading process, a second checksum may be calculated from the read data words. In decisional block 530, the first and second checksum words are compared to determine whether or not there is a match and a message is transmitted acoustically to the controller 30 in a similar manner as that described in connection with the flow chart of FIG. 19B either by block 532 or block 534 indicative of either a successful or failed programming of the code plug 340, respectively.

In summary, a user or programmer may place an activated pager 20 to be programmed or read into the chamber of the enclosure of the programmer 16. The power to the programmer may be turned on and the hinged lid thereof closed to seal out electrical and acoustic interference in the environment. The user may then interact with the personal computer 10 using the keyboard and CRT screen thereof, for example, to enter information into the personal computer regarding the pager 20. The personal computer 10 forms command and data words representative of the user entered information which words are communicated to the controller 30 of the programmer 16 using conventional asynchronous communication techniques, for example. Such command and data words may be formatted in accordance with the reception protocol of the pager 20. In response to the command and data words, the controller 30 of the programmer generates signals to govern the transmitting circuits thereof to select an IF carrier based on the model of the pager 20 and to modulate the IF carrier in accordance with the reception protocol of the pager 20 and the command and data words to form a programming signal which is transmitted over the air to the pager 20. An appropriate matching impedance for signal transmission by the transmitting circuits may also be selected by the controller 30 based on the selected IF carrier.

The pager 20 receives the programming signal which may include a program or read command, and, at times, at least one address of a register(s) of the code plug thereof. In the event that the entire contents of the code plug is to be programmed and/or read, it may not be necessary to transmit a register address with the page message. If a program command, then the programming signal may also include new data to be written into the register(s) of the code plug which may be designated, at times, by the at least one address. When commanded to program, the pager responds by writing the new data into a designated register(s) of the code plug. The pager may then read from the code plug the newly written data words which are formatted and transmitted over the air to the receiving circuits of the programmer. When commanded to read, the pager responds by reading the entire code plug or the data words stored in the designated register(s) thereof. The read data words are also formatted and transmitted over the air to the receiving circuit of the programmer. In the present embodiment, special formatting is performed by the pager to generate a pulse train signal which governs the audio signal generator of the pager to emit audio signals of varying amplitude representing the data words read from the code plug.

At least one microphone of the programmer detects the pager emitted audio signals and converts them to electrical signal representations which are provided to the receiving circuits of the programmer. In the receiving circuits, the data words are recovered from the electrical signal representations based solely on the amplitude levels thereof and the recovered data words are conducted to the controller 30 for programming verification and/or for supplying to the personal computer for viewing by the user on the screen of the CRT thereof. Certain error detection techniques using checksum words, for example, may also be implemented in the foregoing described operations of programming and reading of the code plug of the pager.

While the present invention has been described in connection with a single embodiment, it is understood that additions, modifications and/or deletions may be made to the embodiment without deviating from the principles of the present invention. Accordingly, Applicants' invention should not be limited to any single embodiment, but rather construed in scope and breadth in accordance with the recitation of the appended claims hereto.

What is claimed is:

1. A non-contact pager programming system governed by command and data words generated by a user interactive central controller to program and read a programmable non-volatile memory of a pager, said programmable non-volatile memory having registers for storing a plurality of data words which characterize at least one operation of said pager, said system comprising:

controller means for communicating with said central controller to receive and transmit command and data words between said pager and said central controller, said controller means responsive to command and data words received from said central controller to generate first signals for governing transmission of said command and data words to the pager being programmed in a format based on a reception protocol of said pager and to generate at least one second signal for governing reception of data words from said pager for reading selected storage registers of the non-volatile memory thereof;

transmitting means governed by said first signals to select a carrier frequency corresponding to the pager being programmed and to transmit over the air a programming signal at said carrier frequency digitally modulated in accordance with said pager's reception protocol and said command and data words; and receiving means governed by said at least one second signal to receive over the air signals generated by the pager being programmed in response to said programming signal, said pager generated signals being representative of the data words of said selected storage registers, to convert said received signals to digital signals representing said data words and to conduct said digital signals to said controller means.

2. The programming system in accordance with claim 1 wherein the command and data words received from the user interactive central controller include a programming command, at least one address of a register of the non-volatile memory of the pager being programmed, and a corresponding data word to be programmed in said register; wherein the controller means is responsive to the command and data words to generate first signals to govern the transmitting means to transmit the programming signal including the programming command, at least one address and corresponding data word in accordance with the pager's reception protocol; and wherein the controller means is further operative in response to the programming command to generate first signals to govern the transmitting means to transmit the programming signal including a read command and said at least one address and to generate at least one second signal to govern the receiving means to receive signals generated by the pager being programmed and representative of the data word read from the register of the non-volatile memory thereof corresponding to the at least one address, to convert the received signals to said digital data word, and to conduct the digitized data word back to the controller means for verification of the programming of the register of the pager's non-volatile memory corresponding to the at least one address.

3. The programming system in accordance with claim 2 wherein the controller means is responsive to a programming command from the central controller to transmit at least one data word to the central controller to indicate success or a failure of a programming operation corresponding to said programming command of said user interactive central controller.

4. The programming system in accordance with claim 1 wherein the command and data words received from the user interactive central controller include a programming command, and data words to be programmed in said non-volatile memory of the pager being programmed; wherein the controller means is responsive to the command and data words to generate first signals to govern the transmitting means to transmit the programming signal including the programming command, and corresponding data words in accordance with the pager's reception protocol; and wherein the controller means is further operative in response to the programming command to generate first signals to govern the transmitting means to transmit the programming signal including a read command and to generate at least one second signal to govern the receiving means to receive signals generated by the pager being programmed and representative of the data words read from the non-volatile memory thereof, to convert the received signals to said digital data words, and to conduct the digitized data words back to the controller means for verification of the programming of the pager's non-volatile memory.

5. The programming system in accordance with claim 4 wherein the controller means is responsive to a programming command from the central controller to transmit at least one data word to the central controller to indicate success or a failure of a programming operation corresponding to said programming command of said user interactive central controller.

6. The programming system in accordance with claim 1 wherein the command and data words received from the user interactive central controller include a read command, and at least one address of a register of the non-volatile memory of the pager being read; wherein the controller means is responsive to said command and data words received from said central controller to generate first signals to govern the transmitting means to transmit the programming signal including the read command, and at least one address in accordance with the pager's reception protocol and to generate at least one second signal to govern the receiving means to receive signals generated by the pager being read and representative of the data word read from the register of the non-volatile memory thereof corresponding to the at least one address, to convert the received signals to said digital data word, and to conduct the digitized data word back to the controller means for reading the register of the pager's non-volatile memory corresponding to the at least one address; and wherein the controller means is further responsive to the read command to conduct the received data word corresponding to the at least one address to the central controller for user thereby.

7. The programming system in accordance with claim 1 wherein the command and data words received from the user interactive central controller include a read command for reading the non-volatile memory of the pager being read; wherein the controller means is responsive to said command and data words received from said central controller to generate first signals to govern the transmitting means to transmit the programming signal including the read command in accordance with the pager's reception protocol and to generate at least one second signal to govern the receiving means to receive signals generated by the pager being read and representative of data words read from the registers of the non-volatile memory thereof, to convert the received signals to said digital data words, and to conduct the digitized data words back to the controller means for reading the pager's non-volatile memory; and wherein the controller means is further responsive to the read command to conduct the received data words corresponding to the read command to the central controller for use thereby.

8. The programming system in accordance with claim 1 including a desk top shielded enclosure for containing at least the transmitting means, receiving means and a chamber for accommodating a pager to be programmed.

9. The programming system in accordance with claim 1 wherein the transmitting means includes means governed by the first signals to select a carrier frequency in an intermediate frequency (IF) range of the paper being programmed.

10. The programming system in accordance with claim 1 including means governed by a third signal generated by the controller means to enable and disable the transmitting means and receiving means.

11. The programming system in accordance with claim 1 wherein the controller means includes a programmed microcomputer.

12. The programming system in accordance with claim 1 wherein the controller means generates first signals including a frequency select signal, and data signals formatted in accordance with the reception protocol of the pager being programmed; and wherein the transmitting means includes:
  at least one antenna;
  a modulation circuit for generating a signal at a carrier frequency and governed by said data signals to modulate said carrier frequency signals;
  a frequency select circuit coupled to said modulation circuit and governed by the frequency select signal to select the carrier frequency of the signal generated by the modulation circuit; and
  a power amplifier circuit coupled to the modulation circuit and the at least one antenna and governed by the modulated carrier frequency signal to drive said at least one antenna to transmit the programming signal to the pager being programmed.

13. The programming system in accordance with claim 12 wherein the transmitting means includes an impedance matching circuit coupled to the at least one antenna and the power amplifier; and wherein the controller means generates first signals including an impedance selection signal, said impedance matching circuit governed by the impedance selection signal to form an impedance corresponding to the selected carrier frequency.

14. The programming system in accordance with claim 1 wherein the controller means generates at least one second signal including a control signal; and wherein the signals generated by the pager being programmed in response to said programming signal are audio signals; and wherein the receiving means includes:
  means for receiving said audio signals from the air and converting said audio signals to electrical signal representations thereof;
  means governed by the control signal to recover the data words from said electrical signal representations; and
  means for conducting the recovered data words to said controller means.

15. The programming system in accordance with claim 14 wherein the controller means includes means responsive to an initial data word received from the receiving means for receiving subsequently recovered data words from the receiving means.

16. The programming system in accordance with claim 14 wherein the receiving and converting means includes at least one microphone.

17. The programming system in accordance with claim 14 wherein the receiving and converting means includes a plurality of microphones switchably selected for use by the recovering means.

18. The non-contact pager programming system of claim 1, which includes said pager capable of receiving the over the air a programming signal at said carrier frequency digitally modulated in accordance with a protocol and generating and transmitting the over the air signals in response to said programming signal, said generated signals being representative of the data words of said selected storage areas.

19. A non-contact pager programming system governed by command and data signals generated by user interactive means to program and read a non-volatile memory of a pager, said programmable non-volatile memory having registers for storing a plurality of data words which characterize at least one operation of said pager, said system comprising:
  controller means responsive to command and data signals received from said user interactive means to generate first signals including command and data words for governing transmission of said command and data words to the pager being programmed in a format based on a reception protocol of said pager and to generate at least one second signal for governing reception of data words from said pager for reading selected storage registers of the non-volatile memory thereof;
  transmitting means governed by said first signals to select a carrier frequency corresponding to the pager being programmed and to transmit over the air a programming signal at said carrier frequency digitally modulated in accordance with said pager's reception protocol and said command and data words; and receiving means governed by said at least one second signal to receive over the air signals generated by the pager being programmed in response to said programming signal, said pager generated signals being representative of the data words of said selected storage registers, to convert said received signals to digital signals representing said data words and to conduct said digital signals to said controller means.

20. The programming system in accordance with claim 19 wherein the controller means is responsive to a programming command and at least one data word to generate first signals to govern the transmitting means to transmit the programming signal including the programming command, and corresponding at least one data word in accordance with the pager's reception protocol; and wherein the controller means is further operative in response to the programming command to generate first signals to govern the transmitting means to transmit the programming signal including a read command and to generate at least one second signal to govern the receiving means to receive signals generated over the air by the pager being programmed and representative of the at least one data word read from the non-volatile memory thereof corresponding to the read command, to convert the received signals to said digital data word, and to conduct digitized data back to the controller means for verification of the programming of the pager's non-volatile memory corresponding to the programming command.

21. The programming system in accordance with claim 20 wherein the controller means is responsive to a programming command to generate a signal indicative of success or failure of a programming operation corresponding to said programming command of said user interactive central controller.

22. The programming system in accordance with claim 19 wherein the controller means is responsive to a read command to generate first signals to govern the transmitting means to transmit the programming signal including the read command in accordance with the pager's reception protocol and to generate at least one second signal to govern the receiving means to receive signals generated over the air by the pager being read and representative of at least one data word read from the non-volatile memory thereof corresponding to the read command, to convert the received signals to said at least one digital data word, and to conduct the at least one digitized data word back to the controller means for reading the pager's non-volatile memory corresponding to the read command.

23. The programming system in accordance with claim 19 including a desk top shielded enclosure for containing at least the transmitting means, the receiving means and a chamber for accommodating a pager to be programmed.

24. The programming system in accordance with claim 19 wherein the transmitting means includes means governed by the first signals to select a carrier frequency in an intermediate frequency (IF) range of the pager being programmed.

25. The programming system in accordance with claim 19 including means governed by a third signal generated by the controller means to enable and disable the transmitting means and receiving means.

26. The programming system in accordance with claim 19 wherein the controller means includes a programmed microcomputer.

27. The programming system in accordance with claim 19 wherein the controller means generates first signals including a frequency select signal, and data signals formatted in accordance with the reception protocol of the pager being programmed; and wherein the transmitting means includes:
at least one antenna;
a modulation circuit for generating a signal at a carrier frequency and governed by said data signals to modulate said carrier frequency signals;
a frequency select circuit coupled to said modulation circuit and governed by the frequency select signal to select the carrier frequency of the signal generated by the modulation circuit; and
a power amplifier circuit coupled to the modulation circuit and the at least one antenna and governed by the modulated carrier frequency signal to drive said at least one antenna to transmit the programming signal to the pager being programmed.

28. The programming system in accordance with claim 27 wherein the transmitting means includes an impedance matching circuit coupled to the at least one antenna and the power amplifier; and wherein the controller means generates first signals including an impedance selection signal, said impedance matching circuit governed by the impedance selection signal to form an impedance corresponding to the selected carrier frequency.

29. The programming system in accordance with claim 19 wherein the controller means generates at least one second signal including a control signal; and wherein the signals generated by the pager being programmed in response to said programming signal are audio signals; and wherein the receiving means includes:
means for receiving said audio signals from the air and converting said audio signals to electrical signal representations thereof;
means governed by the control signal to recover the data words from said electrical signal representations; and
means for conducting the recovered data words to said controller means.

30. The programming system in accordance with claim 29 wherein the controller means includes means responsive to an initial data word received from the receiving means for receiving subsequently recovered data words from the receiving means.

31. The programming system in accordance with claim 29 wherein the receiving and converting means includes at least one microphone.

32. The programming system in accordance with claim 29 wherein the receiving and converting means includes a plurality of microphones switchably selected for use by the recovering means.

33. The non-contact pager programming system of claim 19, which includes said pager capable of receiving the over the air a programming signal at said carrier frequency digitally modulated in accordance with a protocol and generating and transmitting the over the air signals in response to said programming signal, said generated signals being representative of the data words of said selected storage areas.

34. A non-contact pager programming system governed by command and data signals generated by user interactive means to program a non-volatile memory of a pager, said programmable non-volatile memory having registers for storing a plurality of data words which characterize at least one operation of said pager, said system comprising:

controller means responsive to command and data signals received from said user interactive means to generate first signals including command and data words for governing transmission of said command and data words to the pager being programmed in a format based on a reception protocol of said pager;

transmitting means governed by said first signals to select a carrier frequency corresponding to the pager being programmed and to transmit over the air a programming signal at said carrier frequency digitally modulated in accordance with said pager's reception protocol and said command and data words, the transmitting means including:

at least one antenna;

a modulation circuit for generating a signal at a carrier frequency and governed by said data signals to modulate said carrier frequency signals;

a frequency select circuit coupled to said modulation circuit and governed by the frequency select signal to select the carrier frequency of the signal generated by the modulation circuit;

a power amplifier circuit coupled to the modulation circuit and the at least one antenna and governed by the modulated carrier frequency signal to drive said at least one antenna to transmit the programming signal to the pager being programmed; and an impedance matching circuit coupled to the at least one antenna and the power amplifier; and wherein the controller means generates first signals including an impedance selection signal, said impedance matching circuit governed by the impedance selection signal to form an impedance corresponding to the selected carrier frequency.

35. The programming system in accordance with claim 34 including a desk top shielded enclosure for containing at least the transmitting means and a chamber for accommodating a pager to be programmed.

36. The programming system in accordance with claim 34 wherein the transmitting means includes means governed by the first signals to select a carrier frequency in an intermediate frequency (IF) range of the pager being programmed.

37. The programming system in accordance with claim 34 including means governed by a third signal generated by the controller means to enable and disable the transmitting means.

38. The programming system in accordance with claim 34 wherein the controller means includes a programmed microcomputer.

39. A pager operative in response to an externally transmitted page message including command and data words to program and read a programmable non-volatile memory thereof in accordance with said command and data words, said non-volatile memory having registers for storing a plurality of data words which characterize at least one operation of said pager, said pager comprising:

means for receiving the page and recovering the command and data words from the message thereof;

means governed by a recovered read command word of a page message to read the data word of at least one register of the non-volatile memory corresponding to said read command and to generate an audio signal representative of said read data word;

means governed by a recovered program command word, and corresponding at least one new data word to write said at least one new data word into at least one register of the non-volatile memory corresponding to said program command;

means for calculating a first checksum word from the at least one new data word received from the page; and means for calculating a second checksum word from the at least one new data word read from the non-volatile memory after being written therein; and means for generating said audio signal indicative of a successful or unsuccessful write operation based on a comparison of the generated first and second checksum words.

40. The pager in accordance with claim 39 wherein the page message is transmitted by a digitally modulated carrier frequency which is in an intermediate frequency range; and wherein the receiving means includes an intermediate frequency stage of the pager.

41. The pager in accordance with claim 39 including means responsive to a read command word to generate a sync word of a predetermined code and to generate the audio signal representative of both of the sync code word and the read data word.

42. The pager in accordance with claim 41 wherein the generating means generates the audio signal representing the sync code word prior to generating the audio signal representing the read data word, whereby the sync code word is included in the generated audio signal as an introduction of the read data word.

43. A system for communicating acoustically between a pager and a programmer, said system comprising:

a pager including:

a memory for storing a plurality of binary coded data words for characterizing at least some operations of said pager;

a digital controller for controlling the operations of said pager, said digital controller responsive to a command signal to access from said memory at least one digital word designated by said command signal and to generate a pulse train signal based on the binary status of the bits of said accessed digital word, said pulse train signal having a format comprising bit time intervals corresponding to each bit of said accessed digital word, said digital controller operative to generate pulses solely during bit time intervals of said pulse train signal corresponding to bits of said accessed digital word which are at a first binary state; and audio signal generating means governed at times by said pulse train signal to generate and emit from said pager audio signals solely in response to pulses of said pulse train signal; and a programmer including:

means for detecting the audio signals emitted from said pager and for converting said audio signals into electrical signal representations; and means for recovering said binary coded digital word from said electrical signal representations based solely on amplitude variations thereof, the recovering means including:
  means for generating an amplitude threshold signal dynamically from the amplitude variations of the electrical signal representations; and
  means for comparing said amplitude threshold signal with the amplitude variations of said electrical signal representations to serially form the binary coded digital word corresponding thereto.

44. The system in accordance with claim 43 wherein the generating means includes resetting means responsive to a reset signal for resetting the amplitude threshold signal to a predetermined amplitude level.

45. A system for communicating acoustically between a pager and a programmer, said system comprising:
  a pager including:
  a memory for storing a plurality of binary coded data words for characterizing at least some operations of said pager;
  a digital controller for controlling the operations of said pager, said digital controller responsive to a command signal to access from said memory at least one digital word designated by said command signal and to generate a pulse train signal based on the binary status of the bits of said accessed digital word, said pulse train signal having a format comprising bit time intervals corresponding to each bit of said accessed digital word, said digital controller operative to generate pulses solely during bit time intervals of said pulse train signal corresponding to bits of said accessed digital word which are at a first binary state; and
  audio signal generating means governed at times by said pulse train signal to generate and emit from said pager audio signals solely in response to pulses of said pulse train signal; and
  a programmer including:
  means for detecting the audio signals emitted from said pager and for converting said audio signals into electrical signal representations; and
  means for recovering said binary coded digital word from said electrical signal representations based solely on amplitude variations thereof, the recovering means including:
    an amplifier and filter circuit coupled to the converting means for generating a first signal representation of the electrical signal representations.
    a peak-to-peak AC to DC converter circuit coupled to the amplifier and filter circuit and responsive to said first signal representation to generate a second signal representation;
    a peak detector circuit coupled to the AC to DC converter circuit and responsive to the second signal representation to generate a peak signal representation;
    a circuit for generating a amplitude threshold signal from the peak signal representation; and
    a comparator circuit coupled to both of the AC to DC converter circuit and the peak detector circuit to compare the amplitude levels of the second signal representations and amplitude threshold signal to from serially the binary coded digital word corresponding thereto.

46. The system in accordance with claim 45 wherein the peak detector circuit includes a reset circuit responsive to a reset signal to reset the peak signal representation to a predetermined amplitude level.

* * * * *